US008489243B2

(12) United States Patent
Fadell et al.

(10) Patent No.: US 8,489,243 B2
(45) Date of Patent: Jul. 16, 2013

(54) THERMOSTAT USER INTERFACE

(71) Applicant: Nest Labs, Inc., Palo Alto, CA (US)

(72) Inventors: Anthony M. Fadell, Portola Valley, CA (US); Matthew L. Rogers, Los Gatos, CA (US); David Sloo, Menlo Park, CA (US); Michael J. Matas, San Francisco, CA (US); Michael Plitkins, Berkeley, CA (US)

(73) Assignee: Nest Labs, Inc., Palo Alto, CA (US)

( * ) Notice: Subject to any disclaimer, the term of this patent is extended or adjusted under 35 U.S.C. 154(b) by 0 days.

(21) Appl. No.: 13/632,734

(22) Filed: Oct. 1, 2012

(65) Prior Publication Data

US 2013/0046397 A1     Feb. 21, 2013

Related U.S. Application Data

(63) Continuation of application No. 13/487,475, filed on Jun. 4, 2012, now Pat. No. 8,280,536, which is a (Continued)

(51) Int. Cl.
| | | |
|---|---|---|
| *G05B 15/00* | (2006.01) | |
| *G05B 13/00* | (2006.01) | |
| *G01M 1/38* | (2006.01) | |
| *F24F 11/053* | (2006.01) | |
| *F23N 1/00* | (2006.01) | |
| *F28F 27/00* | (2006.01) | |

(52) U.S. Cl.
USPC ............... 700/277; 700/17; 700/82; 700/83; 700/276; 236/1 C; 236/1 E; 236/18; 236/46 R; 236/51; 236/94

(58) Field of Classification Search
USPC ............... 700/17, 83, 82, 276, 277; 236/1 C, 236/1 E, 18, 46 R, 51, 94
See application file for complete search history.

(56) References Cited

U.S. PATENT DOCUMENTS

| | | | |
|---|---|---|---|
| 2,558,648 | A | 6/1951 | Gausmann |
| 4,316,577 | A | 2/1982 | Adams et al. |

(Continued)

FOREIGN PATENT DOCUMENTS

| | | |
|---|---|---|
| DE | 19609390 A1 | 9/1997 |
| EP | 207295 A1 | 1/1987 |

(Continued)

OTHER PUBLICATIONS

International Search Report and Written Opinion mailed Jul. 6, 2012 in Application No. PCT/US2012/030084 filed Mar. 22, 2012.

(Continued)

*Primary Examiner* — Ronald Hartman, Jr.
(74) *Attorney, Agent, or Firm* — Kilpatrick Townsend & Stockton LLP

(57) ABSTRACT

A thermostat for controlling an HVAC system is described, the thermostat having a user interface that is visually pleasing, approachable, and easy to use while also providing ready access to, and intuitive navigation within, a menuing system capable of receiving a variety of different types of user settings and/or control parameters. For some embodiments, the thermostat comprises a housing, a ring-shaped user-interface component configured to track a rotational input motion of a user, a processing system configured to identify a setpoint temperature value based on the tracked rotational input motion, and an electronic display coupled to the processing system. An interactive thermostat menuing system is accessible to the user by an inward pressing of the ring-shaped user interface component. User navigation within the interactive thermostat menuing system is achievable by virtue of respective rotational input motions and inward pressings of the ring-shaped user interface component.

20 Claims, 24 Drawing Sheets

Related U.S. Application Data continuation of application No. 13/351,688, filed on Jan. 17, 2012, now Pat. No. 8,195,313, which is a continuation-in-part of application No. PCT/US2011/061437, filed on Nov. 18, 2011, and a continuation-in-part of application No. 13/199,108, filed on Aug. 17, 2011, which is a continuation-in-part of application No. 13/033,573, filed on Feb. 23, 2011, said application No. 13/351,688 is a continuation-in-part of application No. 13/269,501, filed on Oct. 7, 2011, which is a continuation-in-part of application No. 13/033,573.

(60) Provisional application No. 61/415,771, filed on Nov. 19, 2010, provisional application No. 61/429,093, filed on Dec. 31, 2010, provisional application No. 61/627,996, filed on Oct. 21, 2011.

(56) References Cited

U.S. PATENT DOCUMENTS

| | | | |
|---|---|---|---|
| 4,613,139 A | 9/1986 | Robinson, II et al. | |
| 4,621,336 A | 11/1986 | Brown | |
| 4,669,654 A * | 6/1987 | Levine et al. | 236/46 R |
| 4,741,476 A | 5/1988 | Russo et al. | |
| 4,751,961 A | 6/1988 | Levine et al. | |
| 4,768,706 A | 9/1988 | Parfitt | |
| 5,005,365 A | 4/1991 | Lynch | |
| 5,224,649 A | 7/1993 | Brown et al. | |
| 5,294,047 A | 3/1994 | Schwer et al. | |
| 5,303,612 A | 4/1994 | Odom et al. | |
| 5,395,042 A | 3/1995 | Riley et al. | |
| 5,482,209 A | 1/1996 | Cochran et al. | |
| 5,485,954 A | 1/1996 | Guy et al. | |
| 5,544,036 A | 8/1996 | Brown, Jr. et al. | |
| 5,555,927 A | 9/1996 | Shah | |
| 5,603,451 A | 2/1997 | Helander et al. | |
| 5,627,531 A | 5/1997 | Posso et al. | |
| 5,673,850 A * | 10/1997 | Uptegraph | 236/46 R |
| 5,690,277 A | 11/1997 | Flood | |
| 5,779,143 A | 7/1998 | Michaud et al. | |
| 5,808,602 A | 9/1998 | Sellers | |
| 5,931,378 A | 8/1999 | Schramm | |
| 6,032,867 A | 3/2000 | Dushane et al. | |
| 6,164,374 A | 12/2000 | Rhodes et al. | |
| 6,206,295 B1 | 3/2001 | LaCoste | |
| 6,211,921 B1 | 4/2001 | Cherian et al. | |
| 6,213,404 B1 | 4/2001 | Dushane et al. | |
| 6,286,764 B1 | 9/2001 | Garvey et al. | |
| 6,298,285 B1 | 10/2001 | Addink et al. | |
| 6,318,639 B1 | 11/2001 | Toth | |
| 6,351,693 B1 | 2/2002 | Monie et al. | |
| 6,453,687 B2 | 9/2002 | Sharood et al. | |
| 6,502,758 B2 | 1/2003 | Cottrell | |
| 6,519,509 B1 | 2/2003 | Nierlich et al. | |
| D471,825 S | 3/2003 | Peabody | |
| 6,595,430 B1 | 7/2003 | Shah | |
| 6,622,925 B2 | 9/2003 | Carner et al. | |
| 6,636,197 B1 | 10/2003 | Goldenberg et al. | |
| 6,641,054 B2 | 11/2003 | Morey | |
| 6,641,055 B1 | 11/2003 | Tiernan | |
| 6,644,557 B1 | 11/2003 | Jacobs | |
| 6,726,112 B1 | 4/2004 | Ho | |
| 6,814,299 B1 | 11/2004 | Carey | |
| 6,824,069 B2 | 11/2004 | Rosen | |
| 6,851,621 B1 | 2/2005 | Wacker et al. | |
| D503,631 S | 4/2005 | Peabody | |
| 6,951,306 B2 | 10/2005 | DeLuca | |
| 7,000,849 B2 | 2/2006 | Ashworth et al. | |
| 7,028,912 B1 | 4/2006 | Rosen | |
| 7,055,759 B2 | 6/2006 | Wacker et al. | |
| 7,083,109 B2 | 8/2006 | Pouchak | |
| 7,108,194 B1 | 9/2006 | Hankins, II | |
| 7,111,788 B2 | 9/2006 | Reponen | |
| 7,114,554 B2 | 10/2006 | Bergman et al. | |
| 7,140,551 B2 | 11/2006 | de Pauw et al. | |
| 7,141,748 B2 | 11/2006 | Tanaka et al. | |
| 7,142,948 B2 | 11/2006 | Metz | |
| 7,152,806 B1 | 12/2006 | Rosen | |
| 7,156,318 B1 | 1/2007 | Rosen | |
| 7,159,789 B2 | 1/2007 | Schwendinger et al. | |
| 7,159,790 B2 | 1/2007 | Schwendinger et al. | |
| 7,181,317 B2 | 2/2007 | Amundson et al. | |
| 7,222,494 B2 | 5/2007 | Peterson et al. | |
| 7,222,800 B2 | 5/2007 | Wruck | |
| 7,225,054 B2 | 5/2007 | Amundson et al. | |
| 7,258,280 B2 | 8/2007 | Wolfson | |
| 7,264,175 B2 | 9/2007 | Schwendinger et al. | |
| 7,274,972 B2 | 9/2007 | Amundson et al. | |
| 7,287,709 B2 | 10/2007 | Proffitt et al. | |
| 7,299,996 B2 | 11/2007 | Garrett et al. | |
| 7,302,642 B2 | 11/2007 | Smith et al. | |
| 7,333,880 B2 | 2/2008 | Brewster et al. | |
| D566,587 S | 4/2008 | Rosen | |
| 7,434,742 B2 | 10/2008 | Mueller et al. | |
| 7,451,937 B2 | 11/2008 | Flood et al. | |
| 7,455,240 B2 | 11/2008 | Chapman, Jr. et al. | |
| 7,509,753 B2 | 3/2009 | Nicosia et al. | |
| 7,537,171 B2 | 5/2009 | Mueller et al. | |
| 7,555,364 B2 | 6/2009 | Poth et al. | |
| 7,558,648 B2 | 7/2009 | Hoglund et al. | |
| 7,584,899 B2 | 9/2009 | de Pauw et al. | |
| 7,600,694 B2 | 10/2009 | Helt et al. | |
| D603,277 S | 11/2009 | Clausen et al. | |
| 7,614,567 B2 | 11/2009 | Chapman, Jr. et al. | |
| 7,624,931 B2 | 12/2009 | Chapman, Jr. et al. | |
| 7,634,504 B2 | 12/2009 | Amundson | |
| 7,641,126 B2 | 1/2010 | Schultz et al. | |
| 7,667,163 B2 * | 2/2010 | Ashworth et al. | 219/502 |
| 7,693,582 B2 | 4/2010 | Bergman et al. | |
| 7,703,694 B2 | 4/2010 | Mueller et al. | |
| D614,976 S | 5/2010 | Skafdrup et al. | |
| 7,802,618 B2 | 9/2010 | Simon et al. | |
| 7,845,576 B2 | 12/2010 | Siddaramanna et al. | |
| 7,890,195 B2 | 2/2011 | Bergman et al. | |
| 7,904,209 B2 | 3/2011 | Podgorny et al. | |
| 7,904,830 B2 | 3/2011 | Hoglund et al. | |
| 7,913,925 B2 | 3/2011 | Ashworth | |
| D651,529 S | 1/2012 | Mongell et al. | |
| D660,732 S | 5/2012 | Bould et al. | |
| 8,195,313 B1 | 6/2012 | Fadell et al. | |
| 8,280,536 B1 | 10/2012 | Fadell et al. | |
| D677,180 S | 3/2013 | Plitkins et al. | |
| 2002/0005435 A1 | 1/2002 | Cottrell | |
| 2003/0034898 A1 | 2/2003 | Shamoon et al. | |
| 2003/0042320 A1 | 3/2003 | Decker | |
| 2004/0034484 A1 | 2/2004 | Solomita, Jr. et al. | |
| 2004/0055446 A1 | 3/2004 | Robbin et al. | |
| 2004/0256472 A1 | 12/2004 | DeLuca | |
| 2004/0260427 A1 | 12/2004 | Wimsatt | |
| 2004/0262410 A1 | 12/2004 | Hull | |
| 2005/0119766 A1 | 6/2005 | Amundson et al. | |
| 2005/0119793 A1 | 6/2005 | Amundson et al. | |
| 2005/0195757 A1 | 9/2005 | Kidder et al. | |
| 2005/0204997 A1 | 9/2005 | Fournier | |
| 2007/0045430 A1 | 3/2007 | Chapman et al. | |
| 2007/0045433 A1 | 3/2007 | Chapman et al. | |
| 2007/0045444 A1 | 3/2007 | Gray et al. | |
| 2007/0050732 A1 | 3/2007 | Chapman et al. | |
| 2007/0057079 A1 | 3/2007 | Stark et al. | |
| 2007/0158442 A1 | 7/2007 | Chapman et al. | |
| 2007/0158444 A1 | 7/2007 | Naujok et al. | |
| 2007/0173978 A1 | 7/2007 | Fein et al. | |
| 2007/0225867 A1 | 9/2007 | Moorer et al. | |
| 2007/0227721 A1 | 10/2007 | Springer et al. | |
| 2007/0228183 A1 | 10/2007 | Kennedy et al. | |
| 2007/0241203 A1 | 10/2007 | Wagner et al. | |
| 2007/0257120 A1 | 11/2007 | Chapman et al. | |
| 2007/0278320 A1 | 12/2007 | Lunacek et al. | |
| 2008/0006709 A1 | 1/2008 | Ashworth et al. | |

| | | | |
|---|---|---|---|
| 2008/0048046 | A1 | 2/2008 | Wagner et al. |
| 2008/0054082 | A1 | 3/2008 | Evans et al. |
| 2008/0054084 | A1 | 3/2008 | Olson |
| 2008/0191045 | A1 | 8/2008 | Harter |
| 2008/0245480 | A1 | 10/2008 | Knight et al. |
| 2008/0290183 | A1 | 11/2008 | Laberge et al. |
| 2009/0001180 | A1 | 1/2009 | Siddaramanna et al. |
| 2009/0024927 | A1 | 1/2009 | Schrock et al. |
| 2009/0140056 | A1 | 6/2009 | Leen |
| 2009/0140057 | A1 | 6/2009 | Leen |
| 2009/0143916 | A1 | 6/2009 | Boll et al. |
| 2009/0195349 | A1 | 8/2009 | Frader-Thompson et al. |
| 2009/0215534 | A1 | 8/2009 | Wilson et al. |
| 2009/0283603 | A1 | 11/2009 | Peterson et al. |
| 2010/0070085 | A1 | 3/2010 | Harrod et al. |
| 2010/0070086 | A1 | 3/2010 | Harrod et al. |
| 2010/0070089 | A1 | 3/2010 | Harrod et al. |
| 2010/0070093 | A1 | 3/2010 | Harrod et al. |
| 2010/0070907 | A1 | 3/2010 | Harrod et al. |
| 2010/0084482 | A1 | 4/2010 | Kennedy et al. |
| 2010/0106305 | A1 | 4/2010 | Pavlak et al. |
| 2010/0106322 | A1 | 4/2010 | Grohman |
| 2010/0107070 | A1 | 4/2010 | Devineni et al. |
| 2010/0107076 | A1 | 4/2010 | Grohman et al. |
| 2010/0198425 | A1* | 8/2010 | Donovan ................... 700/299 |
| 2010/0289643 | A1 | 11/2010 | Trundle et al. |
| 2010/0318227 | A1 | 12/2010 | Steinberg et al. |
| 2011/0015798 | A1 | 1/2011 | Golden et al. |
| 2011/0015802 | A1 | 1/2011 | Imes |
| 2011/0046756 | A1 | 2/2011 | Park |
| 2012/0065783 | A1 | 3/2012 | Fadell et al. |
| 2012/0066168 | A1 | 3/2012 | Fadell et al. |
| 2012/0125559 | A1 | 5/2012 | Fadell et al. |
| 2012/0125592 | A1 | 5/2012 | Fadell et al. |
| 2012/0126019 | A1 | 5/2012 | Warren et al. |
| 2012/0126020 | A1 | 5/2012 | Filson et al. |
| 2012/0126021 | A1 | 5/2012 | Warren et al. |
| 2012/0128025 | A1 | 5/2012 | Huppi et al. |
| 2012/0130546 | A1 | 5/2012 | Matas et al. |
| 2012/0130547 | A1 | 5/2012 | Fadell et al. |
| 2012/0130548 | A1 | 5/2012 | Fadell et al. |
| 2012/0130679 | A1 | 5/2012 | Fadell et al. |
| 2012/0131504 | A1 | 5/2012 | Fadell et al. |
| 2012/0179300 | A1 | 7/2012 | Warren et al. |
| 2012/0186774 | A1 | 7/2012 | Matsuoka et al. |
| 2012/0191257 | A1 | 7/2012 | Corcoran et al. |
| 2012/0199660 | A1 | 8/2012 | Warren et al. |
| 2012/0203379 | A1 | 8/2012 | Sloo et al. |
| 2012/0229521 | A1 | 9/2012 | Hales, IV et al. |
| 2012/0233478 | A1 | 9/2012 | Mucignat et al. |
| 2012/0239207 | A1 | 9/2012 | Fadell et al. |
| 2012/0239221 | A1 | 9/2012 | Mighdoll et al. |

FOREIGN PATENT DOCUMENTS

| | | | |
|---|---|---|---|
| EP | 434926 | A2 | 7/1991 |
| EP | 720077 | A2 | 7/1996 |
| EP | 802471 | A2 | 10/1997 |
| EP | 1065079 | A2 | 1/2001 |
| EP | 1731984 | A1 | 12/2006 |
| EP | 1283396 | B1 | 3/2007 |
| EP | 2009073496 | A2 | 6/2009 |
| EP | 2157492 | A2 | 2/2010 |
| EP | 1703356 | B1 | 9/2011 |
| GB | 2212317 | B | 5/1992 |
| JP | 59106311 | A | 6/1984 |
| JP | 2002087050 | A | 3/2002 |
| JP | 2003054290 | A | 2/2003 |
| NL | 1024986 | C2 | 6/2005 |
| WO | 0248851 | A2 | 6/2002 |
| WO | 2005019740 | A1 | 3/2005 |
| WO | 2011128416 | A2 | 10/2011 |
| WO | 2012068436 | A1 | 5/2012 |
| WO | 2012068437 | A2 | 5/2012 |
| WO | 2012068447 | A2 | 5/2012 |
| WO | 2012068453 | A1 | 5/2012 |
| WO | 2012068459 | A2 | 5/2012 |
| WO | 2012068495 | A1 | 5/2012 |
| WO | 2012068503 | A1 | 5/2012 |
| WO | 2012068507 | A2 | 5/2012 |

OTHER PUBLICATIONS

Energy Joule. Datasheet [online]. Ambient Devices, No Date Given [retrieved on Aug. 1, 2012]. Retrieved from the Internet: <URL: http://web.archive.org/web/20110723210421/http://www.ambient-devices.com/products/energyjoule.html>.

Honeywell CT2700, An Electronic Round Programmable Thermostat—User's Guide, Honeywell, Inc., 1997, 8 pages.

Honeywell CT8775A,C, The Digital Round Non-Programmable Thermostats—Owner's Guide, Honeywell International Inc., 2003, 20 pages.

Honeywell T8700C, An Electronic Round Programmable Thermostat—Owner's Guide, Honeywell, Inc., 1997, 12 pages.

Honeywell T8775 The Digital Round Thermostat, Honeywell, 2003, 2 pages.

Honeywell T8775A,C Digital Round Thermostat Manual No. 69-1679EF-1, www.honeywell.com/yourhome, Jun. 2004, pp. 1-16.

ICY BV ICY 3815TT-001 Timer-Thermostat Package Box, Product Bar Code No. 8717953007902. No Date Given, 2 pages.

Introducing the New Smart Si Thermostat. Datasheet [online]. Ecobee, No Date Given [retrieved on Feb. 25, 2013]. Retrieved from the Internet: <URL: https://www.ecobee.com/solutions/home/smart-si/>.

The Clever Thermostat, ICY BV Web Page, http://wwwicy.nl/en/consumer/products/clever-thermostat, 2012 ICY BV, 1 page.

The Clever Thermostat User Manual and installation Guide, ICY BV ICY3815 Timer-Thermostat, 2009, pp. 1-36.

Notice of Allowance issued in US Appl. No. 13/351,688 mailed on Apr. 10, 2012; 12 pages.

Notice of Allowance issued in U.S. Appl. No. 13/351,688 mailed on Apr. 27, 2012; 13 pages.

Corrected Notice of Allowability issued in U.S. Appl. No. 13/351,688 mailed on May 1, 2012; 7 pages.

Non-final Rejection issued in U.S. Appl. No. 13/487,475 mailed on Jul. 19, 2012; 7 pages.

Notice of Allowance issued in U.S. Appl. No. 13/487,475 mailed on Aug. 17, 2012; 13 pages.

U.S. Appl. No. 60/512,886, Volkswagen Rotary Knob for Motor Vehicle—English Translation of German Application filed Oct. 20, 2003.

Arens et al., Demand Response Electrical Appliance Manager—User Interface Design, Development and Testing, Poster, Demand Response Enabling Technology Development, University of Caiifornia Berkeley, 2005. Retrieved from dr.berkeley.edu/dream/posters/2005_6GUIposter.pdf, 1 page.

Arens et al., Demand Response Enabled Thermostat—Control Strategies and Interface, Demand Response Enabling Technology Development Poster, University of California Berkeley, 2004. Retrieved from dr.berkeley.edu/dream/posters/2004_11CEC_TstatPoster.pdf, 1 page.

Arens et al., "Demand Response Enabling Technology Development", Phase I Report Jun. 2003-Nov.2005, Jul. 27, P:/DemandRes/UC Papers/DR-Phase1Report-Final DraftApril24-26.doc, University of California Berkeley, pp. 1-108.

Arens et al., New Thermostat Demand Response Enabling Technology, Poster, Jun. 10, 2004, University of California Berkeley.

Auslander et al., UC Berkeley DR Research Energy Management Group, Power Point Presentation, DR ETD Workshop, Jun. 11, 2007, State of California Energy Commission, pp. 1-35.

Chen et al., Demand Response-Enabled Residential Thermostat Controls, Abstract, ACEEE Summer Study on Energy Efficiency in Buildings, 2008, Mechanical Engineering Dept. and Architecture Dept., University of California Berkeley, pp. 1-24 through 1-36.

Peffer at al., Smart Comfort At Home: Design of a Residential Thermostat to Achieve Thermal Comfort, and Save Money and Peak Energy, Poster, Mar. 2007, University of California Berkeley.

Gao et al., The Self-Programming Thermostat: Optimizing Setback Schedules Based on Home Occupancy Patterns, Proceedings of the First ACM Workshop on Embedded Sensing Systems for Energy-Efficiency in Buildings, Association for Computing Machinery, Nov. 2009, pp. 67-72.

Green, Thermo Heat Tech Cool, Popular Mechanics Electronic Thermostat Guide, Oct. 1985, pp. 155-158.

Meier et al., Thermostat Interface and Usability: A Survey, Ernest Orlando Lawrence Berkeley National Laboratory, Environmental Energy Technologies Division, Berkeley California, Sep. 2010, pp. 1-73.

Peffer et al, A Tale of Two Houses: The Human Dimension of Demand Response Enabling Technology from a Case Study of Adaptive Wireless Thermostat, Abstract, ACEEE Summer Study on Energy Efficiency in Buildings, 2008, Architecture Dept. and Mechanical Engineering Dept., University of California Berkeley., pp. 7-242 through 7-253.

Salus, S-Series Digital Thermostat Instruction Manual-ST620 Model No. Instruction Manual, www.salus-tech.com, Version 005, Apr. 29, 2010, 24 pages.

Sanford, iPod (Click Wheel) (2004), www.apple-history.com [retrieved on Apr. 9, 2012]. Retrieved from: http://apple-history.com/ipod, 2 pages.

Wright et al., Dr ETD—Summary of New Thermostat, TempNode, & New Meter (UC Berkeley Project), Power Point Presentation, Public Interest Energy Research, University of California Berkeley, 2005. Retrieved from http://dr.berkeley.edu/dream/presentations/2005_6CEC.pdf, pp. 1-49.

* cited by examiner

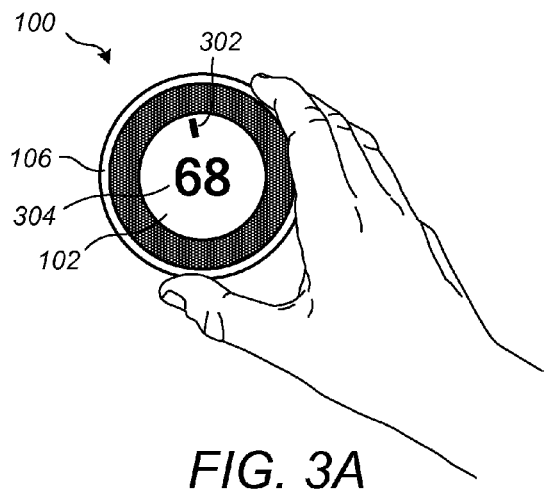
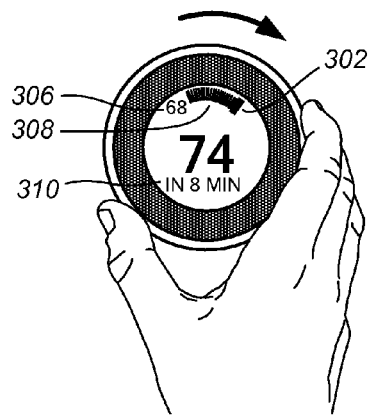
FIG. 3A  FIG. 3B
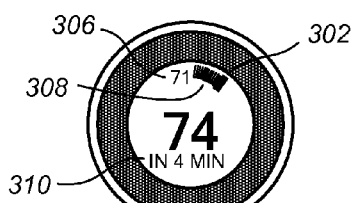  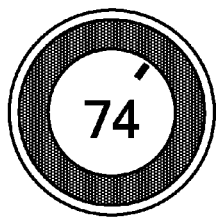
FIG. 3C  FIG. 3D  FIG. 3E
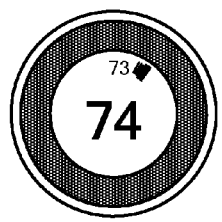  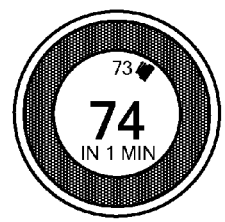
FIG. 3F  FIG. 3G  FIG. 3H
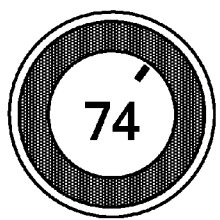 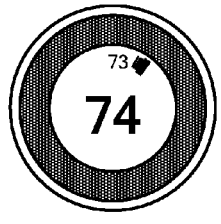 
FIG. 3I  FIG. 3J  FIG. 3K

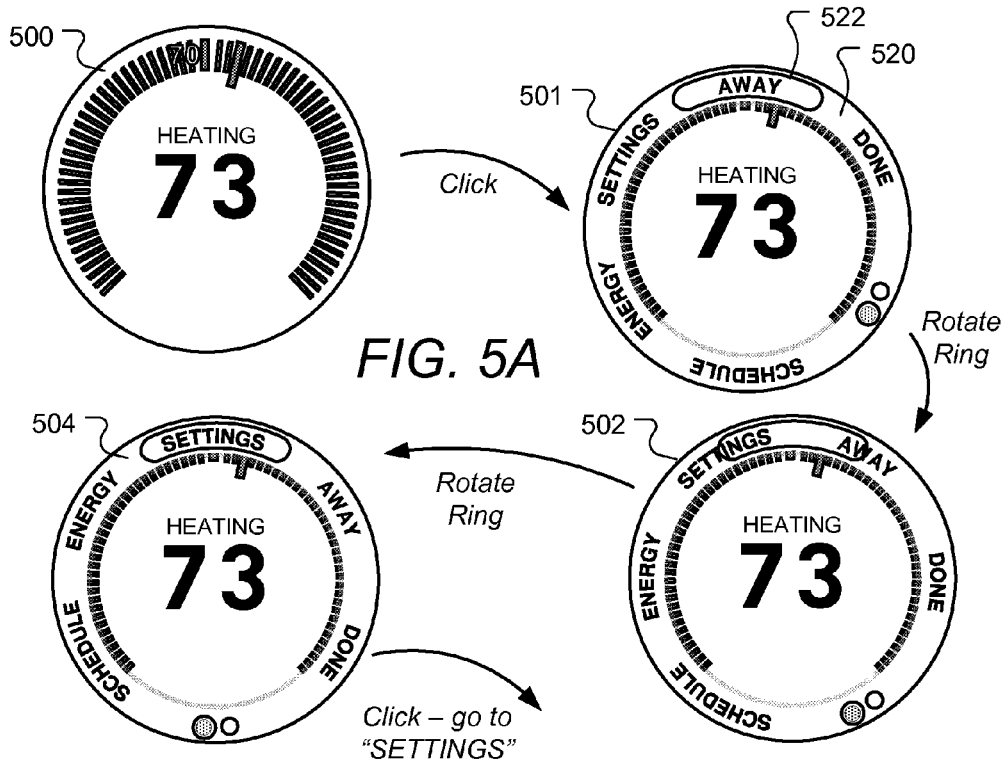
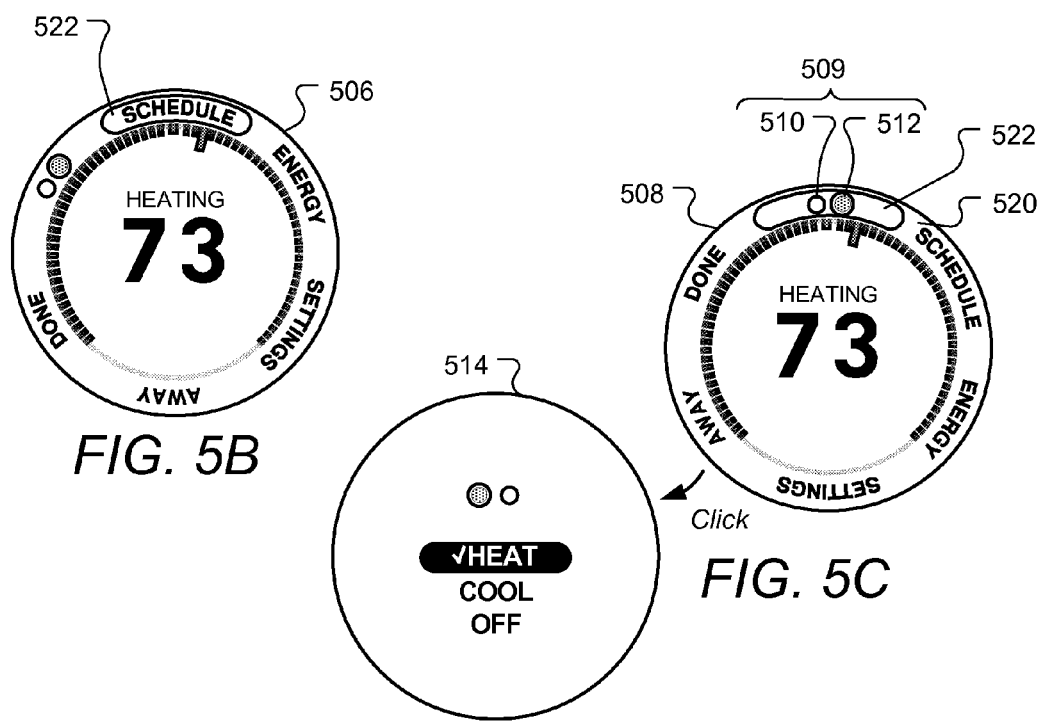
FIG. 5A
FIG. 5B
FIG. 5C

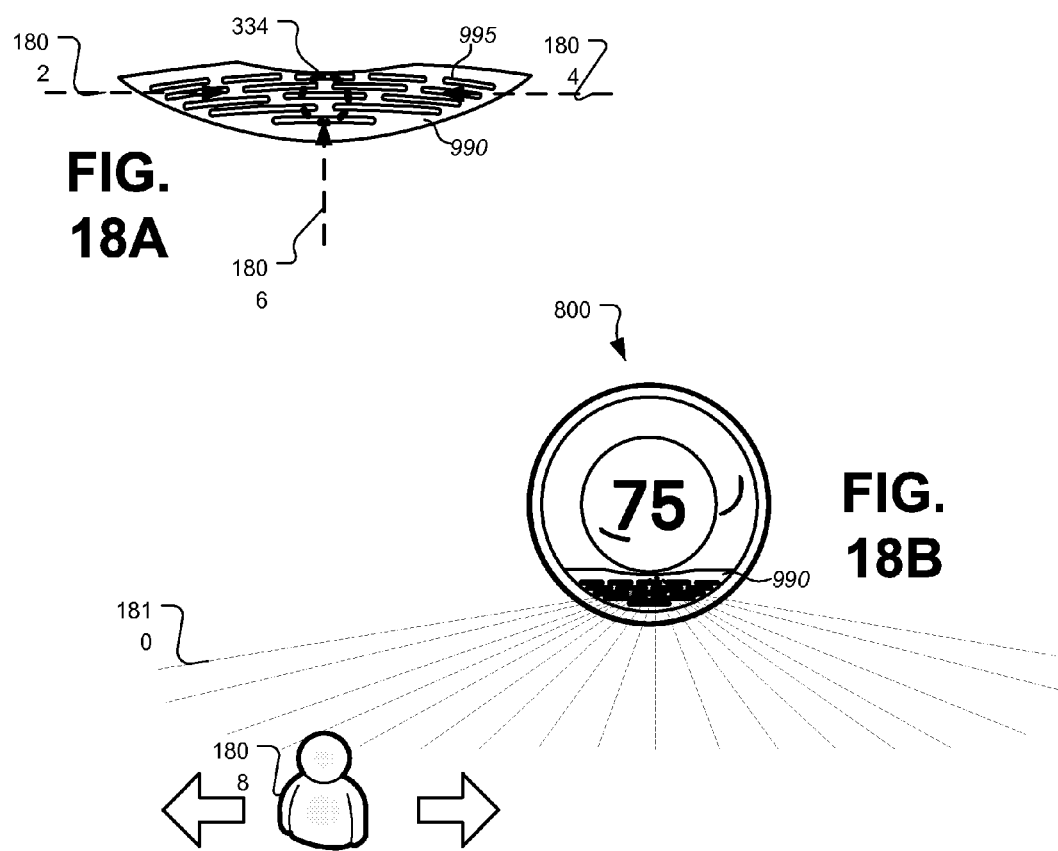

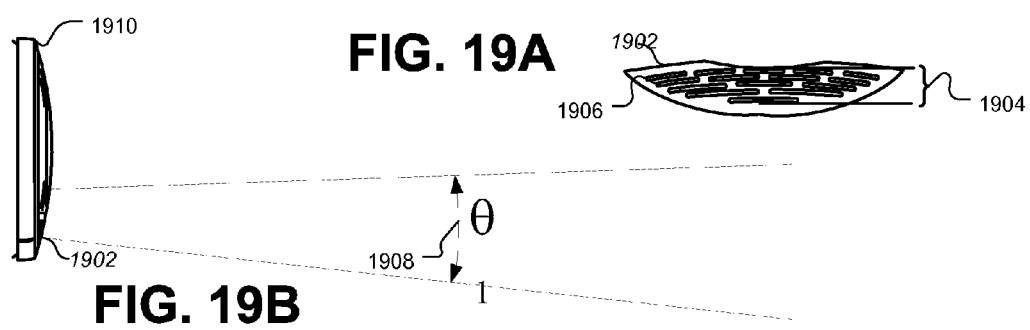
FIG. 19A
FIG. 19B
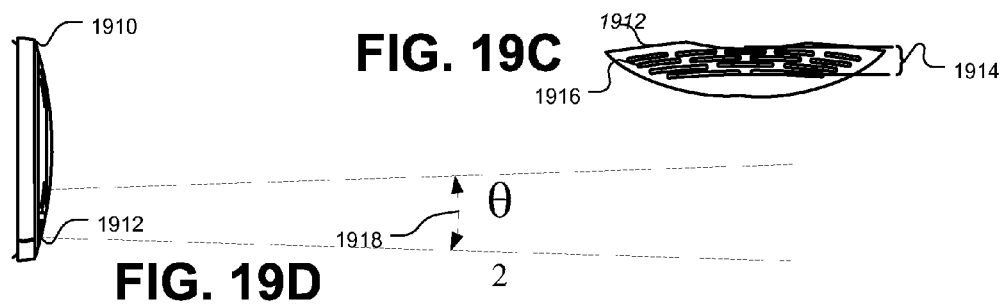
FIG. 19C
FIG. 19D

THERMOSTAT USER INTERFACE

CROSS-REFERENCES TO RELATED APPLICATIONS

This application is a continuation of U.S. Ser. No. 13/487,475 filed on Jun. 4, 2012, which is a continuation of U.S. Ser. No. 13/351,688 filed on Jan. 17, 2012, which is a continuation-in-part of PCT/US11/61437 filed Nov. 18, 2011, which claimed the benefit of: U.S. Prov. Ser. No. 61/415,771 filed on Nov. 19, 2010; U.S. Prov. Ser. No. 61/429,093 filed on Dec. 31, 2010; and U.S. Prov. Ser. No. 61/627,996 filed on Oct. 21, 2011.

U.S. Ser. No. 13/351,688 is further a continuation-in-part of U.S. Ser. No. 13/199,108 filed on Feb. 23, 2011, which is a continuation-in-part of U.S. Ser. No. 13/033,573 filed on Feb. 23, 2011, which claims the benefit of: U.S. Prov. Ser. No. 61/415,771 filed Nov. 19, 2010 and U.S. Prov. Ser. No. 61/429,093 filed Dec. 31, 2010.

U.S. Ser. No. 13/351,688 is further a continuation-in-part of U.S. Ser. No. 13/269,501 filed on Oct. 7, 2011, which claims the benefit of U.S. Prov. Ser. No. 61/415,771 filed Nov. 19, 2010 and of U.S. Prov. Ser. No. 61/429,093 filed Dec. 31, 2010. U.S. Ser. No. 13/269,501 is also a continuation-in-part of U.S. Ser. No. 13/033,573 filed Feb. 23, 2011, which claims the benefit of: U.S. Prov. Ser. No. 61/415,771 filed Nov. 19, 2010 and U.S. Prov. Ser. No. 61/429,093 filed Dec. 31, 2010.

Each of the above-listed applications is hereby incorporated by reference in its entirety for all purposes.

FIELD

This patent specification relates to systems, methods, and related computer program products for the monitoring and control of energy-consuming systems or other resource-consuming systems. More particularly, this patent specification relates to user interfaces for control units that govern the operation of energy-consuming systems, household devices, or other resource-consuming systems, including user interfaces for thermostats that govern the operation of heating, ventilation, and air conditioning (HVAC) systems.

BACKGROUND

While substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in 5 energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

Some thermostats offer programming abilities that provide the potential for balancing user comfort and energy savings. However, users are frequently intimidated by a dizzying array of switches and controls. Thus, the thermostat may frequently resort to default programs, thereby reducing user satisfaction and/or energy-saving opportunities.

SUMMARY

Provided according to some embodiments is programmable device, such as a thermostat, for control of an HVAC system. Configurations and positions of device components allow for the device to improve energy conservation and to simultaneously allow users to experience pleasant interactions with the device (e.g., to set preferences). The device has an outer ring that is rotatable, such that a user may circularly scroll through selection options (e.g., corresponding to temperature setpoints). For example, a setpoint temperature may gradually increase as a user rotates the ring in a clockwise direction. Inward pressing of the outer ring may also allow a user to view an interactive menuing system. The user may interact with the menuing system via rotations and/or inward pressings of the outer ring. Thus, the user may be provided with an intuitive and powerful system in which a setpoint temperature and other thermostat operational controls may be set.

In one embodiment the device comprises a passive infrared (PIR) motion sensor disposed inside a housing of the thermostat for sensing occupancy in the vicinity of the device. The PIR motion sensor has a radiation receiving surface and is able to detect lateral movement of an occupant in front of the forward-facing surface of the housing. The device further comprises a grille member having one or more openings and included along the forward-facing surface of the housing, the grille member being placed over the radiation receiving surface of the PIR motion sensor. The grille member is configured and dimensioned to visually conceal and protect the PIR motion sensor disposed inside the housing, the visual concealment promoting a visually pleasing quality of the device, while at the same time permitting the PIR motion sensor to effectively detect the lateral movement of the occupant. In one embodiment, the grille member openings are slit-like openings oriented along a substantially horizontal direction.

In one embodiment a temperature sensor is also positioned behind the grille member, the temperature sensor also being visually concealed behind the grille member. In one embodiment the grille member is formed from a thermally conductive material such as a metal, and the temperature sensor is placed in thermal communication with the metallic grille, such as by using a thermal paste or the like. Advantageously, in addition to exposing the temperature sensor to ambient room air by virtue of the grille openings, the metallic grille member can further improve temperature sensing performance by acting as a sort of "thermal antenna" for the temperature sensor.

In some embodiments, a thermostat is provided. The thermostat may include: a power source; a housing; one or more temperature sensors positioned within the housing to measure an ambient air temperature; a ring-shaped user-interface component configured to track a rotational input motion of a user; a processing system disposed within the housing and coupled to the one or more temperature sensors and to the ring-shaped user interface component, the processing system being configured to dynamically identify a setpoint temperature value based on the tracked rotational input motion; an electronic display coupled to the processing system and configured to dynamically display a digital numerical value representative of the identified setpoint temperature value; and a plurality of heating, ventilation, and air conditioning (HVAC) wire connectors coupled to the processing system, the processing system being configured to send at least one control signal through the HVAC wire connectors to an HVAC system based at least in part on a comparison of the measured ambient temperature and the setpoint temperature value; wherein said ring-shaped user-interface component is further configured to be inwardly pressable by the user along a direction of an axis of rotation of the rotational input motion; wherein said processing system, said electronic display, and said ring-shaped user interface component are collectively configured such that (i) an interactive thermostat menuing system is accessible to the user by an inward pressing of the ring-shaped user interface component, and (ii) a user navigation within the interactive thermostat menuing system is achievable by virtue of respective rotational input motions and inward pressings of the ring-shaped user interface component.

In some embodiments, a method for control of an HVAC system by a thermostat is provided. The thermostat may include: a housing, one or more temperature sensors, a ring-shaped user-interface component, a processing system, an electronic display, and a plurality of HVAC wire connectors. The method may include: measuring an ambient air temperature using the one or more temperature sensors; detecting and tracking rotational movements of the ring-shaped user-interface component to track at least one rotational input motion of a user; dynamically identifying a setpoint temperature value based on the tracked rotational input motion; dynamically displaying a digital numerical value representative of the identified setpoint temperature value on the electronic display; sending at least one control signal through the HVAC wire connectors to the HVAC system based at least in part on a comparison of the measured ambient air temperature and the setpoint temperature value; detecting an inward pressing of the ring-shaped user-interface component by the user, the inward pressing being along a direction of an axis of rotation of said tracked rotational movements of the ring-shaped user-interface component; and responsive to said detected inward pressing of the ring-shaped user-interface component, providing the user with an interactive thermostat menuing system on said electronic display, comprising providing user navigation within the interactive thermostat menuing system by virtue of respective rotational input motions and inward pressings of the ring-shaped user interface component.

In some embodiments, a thermostat is provided. The thermostat may include: a disk-like housing including a circular front face; an electronic display centrally disposed on the front face; an annular ring member disposed around the centrally disposed electronic display, said annular ring member and said housing being mutually configured such that (i) said annular ring member is rotatable around a front-to-back axis of the thermostat, and (ii) said annular ring member is inwardly pressable along a direction of the front-to-back axis; one or more temperature sensors positioned within the housing to measure an ambient air temperature; a processing system disposed within the housing and coupled to the one or more temperature sensors and to the annular ring member; said processing system being configured and programmed to dynamically alter a setpoint temperature value based on a user rotation of the annular ring member; said processing system being further configured and programmed to send at least one control signal to an HVAC system based at least in part on a comparison of the measured ambient air temperature and the setpoint temperature value; said processing system being further configured and programmed to provide an interactive thermostat menuing system on said electronic display responsive to an inward pressing of the annular ring member; said processing system being further configured and programmed to provide user navigation within the interactive thermostat menuing system based on rotation of the annular ring member by the user and inward pressing of the annular ring member by the user.

BRIEF DESCRIPTION OF THE DRAWINGS

FIGS. 3A-3K illustrate user temperature adjustment based on rotation of the outer ring along with an ensuing user interface display according to one embodiment;

FIGS. 5A-5C illustrate user adjustment of setpoint times based on rotation of the outer ring along with an ensuing user interface display according to one embodiment;

FIGS. 18A-18B illustrates infrared sources interacting with the slit-like openings in a grille member designed in accordance with the present invention;

FIGS. 19A-19D illustrate altering the openings of a grille member along a vertical distance to change the sensitivity of a PIR motion sensor in accordance with aspects of the present invention.

DETAILED DESCRIPTION OF THE INVENTION

Figure 1A:
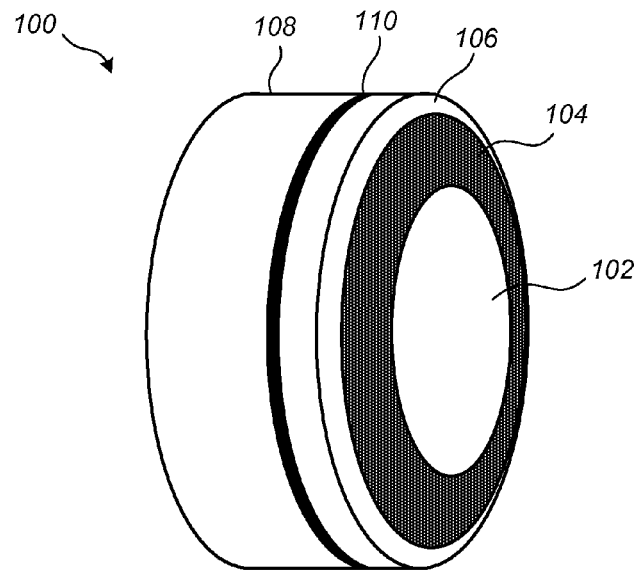
FIG. 1A illustrates a perspective view of a versatile sensing and control unit (VSCU unit) according to an embodiment.

The subject matter of this patent specification relates to the subject matter of the following commonly assigned applications, each of which is incorporated by reference herein: U.S. Ser. No. 12/881,430 filed Sep. 14, 2010; U.S. Ser. No. 12/881, 463 filed Sep. 14, 2010; U.S. Prov. Ser. No. 61/415,771 filed Nov. 19, 2010; U.S. Prov. Ser. No. 61/429,093 filed Dec. 31, 2010; U.S. Ser. No. 12/984,602 filed Jan. 4, 2011; U.S. Ser. No. 12/987,257 filed Jan. 10, 2011; U.S. Ser. No. 13/033,573 filed Feb. 23, 2011; U.S. Ser. No. 29/386,021, filed Feb. 23, 2011; U.S. Ser. No. 13/034,666 filed Feb. 24, 2011; U.S. Ser. No. 13/034,674 filed Feb. 24, 2011; U.S. Ser. No. 13/034,678 filed Feb. 24, 2011; U.S. Ser. No. 13/038,191 filed Mar. 1, 2011; U.S. Ser. No. 13/038,206 filed Mar. 1, 2011; U.S. Ser. No. 29/399,609 filed Aug. 16, 2011; U.S. Ser. No. 29/399,614 filed Aug. 16, 2011; U.S. Ser. No. 29/399,617 filed Aug. 16, 2011; U.S. Ser. No. 29/399,618 filed Aug. 16, 2011; U.S. Ser. No. 29/399,621 filed Aug. 16, 2011; U.S. Ser. No. 29/399,623 filed Aug. 16, 2011; U.S. Ser. No. 29/399,625 filed Aug. 16, 2011; U.S. Ser. No. 29/399,627 filed Aug. 16, 2011; U.S. Ser. No. 29/399,630 filed Aug. 16, 2011; U.S. Ser. No. 29/399,632 filed Aug. 16, 2011; U.S. Ser. No. 29/399,633 filed Aug. 16, 2011; U.S. Ser. No. 29/399,636 filed Aug. 16, 2011; U.S. Ser. No. 29/399,637 filed Aug. 16, 2011; U.S. Ser. No. 13/199, 108, filed Aug. 17, 2011; U.S. Ser. No. 13/267,871 filed Oct. 6, 2011; U.S. Ser. No. 13/267,877 filed Oct. 6, 2011; U.S. Ser. No. 13/269,501, filed Oct. 7, 2011; U.S. Ser. No. 29/404,096 filed Oct. 14, 2011; U.S. Ser. No. 29/404,097 filed Oct. 14, 2011; U.S. Ser. No. 29/404,098 filed Oct. 14, 2011; U.S. Ser. No. 29/404,099 filed Oct. 14, 2011; U.S. Ser. No. 29/404,101 filed Oct. 14, 2011; U.S. Ser. No. 29/404,103 filed Oct. 14, 2011; U.S. Ser. No. 29/404,104 filed Oct. 14, 2011; U.S. Ser. No. 29/404,105 filed Oct. 14, 2011; U.S. Ser. No. 13/275,307 filed Oct. 17, 2011; U.S. Ser. No. 13/275,311 filed Oct. 17, 2011; U.S. Ser. No. 13/317,423 filed Oct. 17, 2011; U.S. Ser. No. 13/279,151 filed Oct. 21, 2011; U.S. Ser. No. 13/317,557 filed Oct. 21, 2011; U.S. Prov. Ser. No. 61/627,996 filed Oct. 21, 2011; PCT/US11/61339 filed Nov. 18, 2011; PCT/US11/ 61344 filed Nov. 18, 2011; PCT/US11/61365 filed Nov. 18, 2011; PCT/US11/61379 filed Nov. 18, 2011; PCT/US11/ 61391 filed Nov. 18, 2011; PCT/US11/61479 filed Nov. 18, 2011; PCT/US11/61457 filed Nov. 18, 2011; and PCT/US11/ 61470 filed Nov. 18, 2011. The above-referenced patent applications are collectively referenced herein as "the commonly assigned incorporated applications."

Provided according to one or more embodiments are systems, methods, computer program products, and related business methods for controlling one or more HVAC systems based on one or more versatile sensing and control units (VSCU units), each VSCU unit being configured and adapted to provide sophisticated, customized, energy-saving HVAC control functionality while at the same time being visually appealing, non-intimidating, elegant to behold, and delightfully easy to use. The term "thermostat" is used hereinbelow to represent a particular type of VSCU unit (Versatile Sensing and Control) that is particularly applicable for HVAC control in an enclosure. Although "thermostat" and "VSCU unit" may be seen as generally interchangeable for the contexts of HVAC control of an enclosure, it is within the scope of the present teachings for each of the embodiments hereinabove and hereinbelow to be applied to VSCU units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy. Each VSCU unit includes a user-interface component, such as a rotatable ring. Using the ring, a user can easily navigate through and select between selection options (e.g., to set a temperature setpoint or identify preferences). For example, a user may rotate a ring (e.g., in a clockwise direction); a processing system may dynamically identify a setpoint temperature value (e.g., higher than a previous value) based on rotational input; an electronic display may dynamically display a digital numerical value representative of the identified setpoint temperature value. Further, the user may be able to view and/or navigate through a menuing system using the ring. For example, a user input (e.g., inwards pressure on the ring) may result in a presentation of a menuing system on the display. A user may rotate the ring to, e.g., scroll through selection options and select an option by pressing on the ring. Inwards pressure on the ring may cause a distinct sensory response (e.g., a clicking sound or feel) that may confirm to the user that the selection has been made. In some instances, the ring is the primary or only user-input component within the VSCU. Thus, a user will not be intimidated by a large number of controls and will be able to easily understand how to interact with the unit.

Nevertheless, each VSCU unit may be advantageously provided with a selectively layered functionality, such that unsophisticated users are only exposed to a simple user interface, but such that advanced users can access and manipulate many different energy-saving and energy tracking capabilities. For example, an advanced user may be able to set a plurality of time-dependent temperature setpoints (i.e., scheduled setpoints) through thermostat interactions via the rotatable ring, while an unsophisticated user may limit such interactions to only set seemingly or actually static setpoints. Importantly, even for the case of unsophisticated users who are only exposed to the simple user interface, the VSCU unit provides advanced energy-saving functionality that runs in the background, the VSCU unit quietly using multi-sensor technology to "learn" about the home's heating and cooling environment and optimizing the energy-saving settings accordingly.

The VSCU unit also "learns" about the users themselves through user interactions with the device (e.g., via the rotatable ring) and/or through automatic learning of the users' preferences. For example, in a congenial "setup interview", a user may respond to a few simple questions (e.g., by rotating the rotatable ring to a position at which a desired response option is displayed). Multi-sensor technology may later be employed to detect user occupancy patterns (e.g., what times of day they are home and away), and a user's control over set temperature on the dial may be tracked over time. The multi-sensor technology is advantageously hidden away inside the VSCU unit itself, thus avoiding the hassle, complexity, and intimidation factors associated with multiple external sensor-node units. On an ongoing basis, the VSCU unit processes the learned and sensed information according to one or more advanced control algorithms, and then automatically adjusts its environmental control settings to optimize energy usage while at the same time maintaining the living space at optimal levels according to the learned occupancy patterns and comfort preferences of the user. Even further, the VSCU unit is programmed to promote energy-saving behavior in the users themselves by virtue of displaying, at judiciously selected times on its visually appealing user interface, information that encourages reduced energy usage, such as historical energy cost performance, forecasted energy costs, and even fun game-style displays of congratulations and encouragement.

Advantageously, the selectively layered functionality of the VSCU unit allows it to be effective for a variety of different technological circumstances in home and business environments, thereby making the same VSCU unit readily saleable to a wide variety of customers. For simple environments having no wireless home network or internet connectivity, the VSCU unit operates effectively in a standalone mode, being capable of learning and adapting to its environment based on multi-sensor technology and user input, and optimizing HVAC settings accordingly. However, for environments that do indeed have home network or internet connectivity, the VSCU unit can operate effectively in a network-connected mode to offer a rich variety of additional capabilities.

It is to be appreciated that while one or more embodiments is detailed herein for the context of a residential home, such as a single-family house, the scope of the present teachings is not so limited, the present teachings being likewise applicable, without limitation, to duplexes, townhomes, multi-unit apartment buildings, hotels, retail stores, office buildings, industrial buildings, and more generally any living space or work space having one or more HVAC systems. It is to be further appreciated that while the terms user, customer, installer, homeowner, occupant, guest, tenant, landlord, repair person, and the like may be used to refer to the person or persons who are interacting with the VSCU unit or other device or user interface in the context of some particularly advantageous situations described herein, these references are by no means to be considered as limiting the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit and is a customer of the utility company and/or VSCU data service provider. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the embodiments—for example, the password-protected temperature governance functionality described further herein may be particularly advantageous where the landlord holds the sole password and can prevent energy waste by the tenant—such identity should not be construed in the descriptions that follow as necessarily limiting the scope of the present teachings to those particular individuals having those particular identities.

It is to be appreciated that although exemplary embodiments are presented herein for the particular context of HVAC system control, there are a wide variety of other resource usage contexts for which the embodiments are readily applicable including, but not limited to, water usage, air usage, the usage of other natural resources, and the usage of other (i.e., non-HVAC-related) forms of energy, as would be apparent to the skilled artisan in view of the present disclosure. Therefore, such application of the embodiments in such other resource usage contexts is not outside the scope of the present teachings.

As used herein, "setpoint" or "temperature setpoint" refers to a target temperature setting of a temperature control system, such as one or more of the VSCU units described herein, as set by a user or automatically according to a schedule. As would be readily appreciated by a person skilled in the art, many of the disclosed thermostatic functionalities described hereinbelow apply, in counterpart application, to both the heating and cooling contexts, with the only different being in the particular setpoints and directions of temperature movement. To avoid unnecessary repetition, some examples of the embodiments may be presented herein in only one of these contexts, without mentioning the other. Therefore, where a particular embodiment or example is set forth hereinbelow in the context of home heating, the scope of the present teachings is likewise applicable to the counterpart context of home cooling, and vice versa, to the extent such counterpart application would be logically consistent with the disclosed principles as adjudged by the skilled artisan.

FIG. 1A illustrates a perspective view of a versatile sensing and control unit (VSCU unit) 100 according to an embodiment. Unlike so many prior art thermostats, the VSCU unit 100 preferably has a sleek, elegant appearance that does not detract from home decoration, and indeed can serve as a visually pleasing centerpiece for the immediate location in which it is installed. The VSCU unit 100 comprises a main body 108 that is preferably circular with a diameter of about 8 cm, and that has a visually pleasing outer finish, such as a satin nickel or chrome finish. Separated from the main body 108 by a small peripheral gap 110 is a cap-like structure comprising a rotatable outer ring 106, a sensor ring 104, and a circular display monitor 102.

The outer ring 106 preferably has an outer finish identical to that of the main body 108, while the sensor ring 104 and circular display monitor 102 have a common circular glass (or plastic) outer covering that is gently arced in an outward direction and that provides a sleek yet solid and durable-looking overall appearance. The outer ring 106 may be disposed along a front face of a housing of the VSCU unit 100. The front face may be circular, and the housing may be disk-like in shape. The outer ring may substantially surround the circular display monitor or substantially surround a portion of the circular display monitor visible to a user. The outer ring 106 may be generally coincident with an outer lateral periphery of said disk-like shape, as illustrated, e.g., in FIGS. 1A-1C.

The sensor ring 104 contains any of a wide variety of sensors including, without limitation, infrared sensors, visible-light sensors, and acoustic sensors. Preferably, the glass (or plastic) that covers the sensor ring 104 is smoked or mirrored such that the sensors themselves are not visible to the user. An air venting functionality is preferably provided, such as by virtue of the peripheral gap 110, which allows the ambient air to be sensed by the internal sensors without the need for visually unattractive "gills" or grill-like vents.

Figures 1B, 1C:
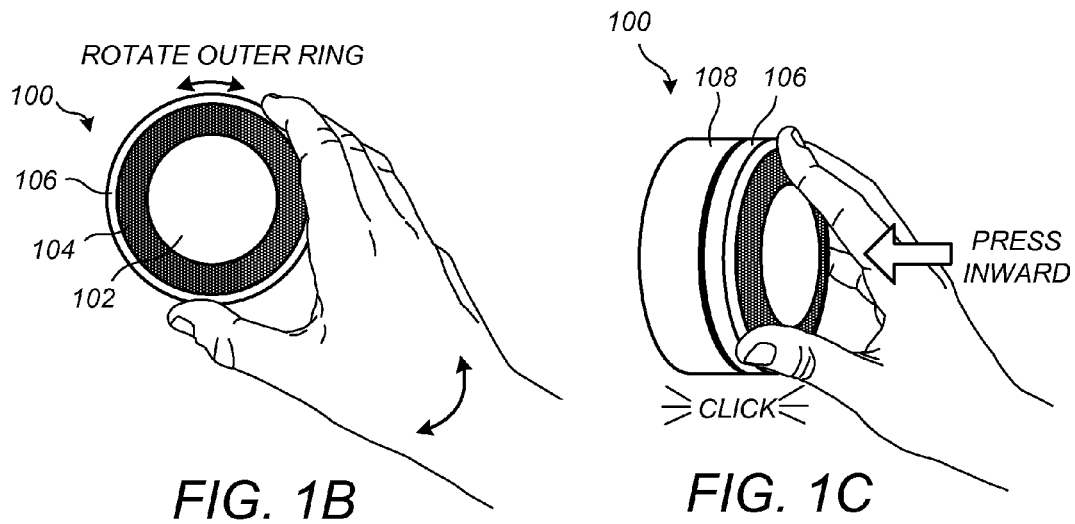
FIGS. 1B-1C illustrate the VSCU unit as it is being controlled by the hand of a user according to an embodiment.

FIGS. 1B-1C illustrate the VSCU unit 100 as it is being controlled by the hand of a user according to an embodiment. In one embodiment, for the combined purposes of inspiring user confidence and further promoting visual and functional elegance, the VSCU unit 100 is controlled by only two types of user input, the first being a rotation of the outer ring 106 (FIG. 1B), and the second being an inward push on the outer ring 106 (FIG. 1C) until an audible and/or tactile "click" occurs. For some embodiments, an interior dome switch (not shown) disposed in mechanical communication with the outer ring 106 provides the audible and/or tactile "click" associated with a completed inward pressing of the ring, the dome switch also providing an associated outward restorative force.

For one embodiment, the inward push of FIG. 1C only causes the outer ring 106 to move forward, while in another embodiment the entire cap-like structure, including both the outer ring 106 and the glass covering of the sensor ring 104 and circular display monitor 102, move inwardly together when pushed. Preferably, the sensor ring 104, the circular display monitor 102, and their common glass covering do not rotate with outer ring 106.

By virtue of user rotation of the outer ring 106 (referenced hereafter as a "ring rotation") and the inward pushing of the outer ring 106 (referenced hereinafter as an "inward click") responsive to intuitive and easy-to-read prompts on the circular display monitor 102, the VSCU unit 100 is advantageously capable of receiving all necessary information from the user for basic setup and operation. Preferably, the outer ring 106 is mechanically mounted in a manner that provides a smooth yet viscous feel to the user, for further promoting an overall feeling of elegance while also reducing spurious or unwanted rotational inputs. According to various implementations, the outer ring 106 rotates on plastic bearings and uses an optical digital encoder to measure the rotational movement and/or rotational position of the outer ring 106. In accordance with alternate implementations, other technologies such as mounting the outer ring 106 on a central shaft may be employed. For one embodiment, the VSCU unit 100 recognizes three fundamental user inputs by virtue of the ring rotation and inward click: (1) ring rotate left, (2) ring rotate right, and (3) inward click.

According to some implementations, multiple types of user input may be generated depending on the way a pushing inward of head unit front including the outer ring 106 is effectuated. In some implementations a single brief push inward of the outer ring 106 until the audible and/or tactile click occurs followed by a release (single click) can be interpreted as one type of user input (also referred to as an "inward click"). In other implementations, pushing the outer ring 106 in and holding with an the inward pressure for an amount of time such as 1-3 seconds can be interpreted as another type of user input (also referred to as a "press and hold"). According to some further implementations, other types of user input can be effectuated by a user such as double and/or multiple clicks, and pressing and holding for longer and/or shorter periods of time. According to other implementations, speed-sensitive or acceleration-sensitive rotational inputs may also be implemented to create further types of user inputs (e.g., a very large and fast leftward rotation specifies an "Away" occupancy state, while a very large and fast rightward rotation specifies an "Occupied" occupancy state).

Although the scope of the present teachings is not so limited, it is preferred that there not be provided a discrete mechanical HEAT-COOL toggle switch, or HEAT-OFF-COOL selection switch, or HEAT-FAN-OFF-COOL switch anywhere on the VSCU unit 100, this omission contributing to the overall visual simplicity and elegance of the VSCU unit 100 while also facilitating the provision of advanced control abilities that would otherwise not be permitted by the existence of such a switch. It is further highly preferred that there be no electrical proxy for such a discrete mechanical switch (e.g., an electrical push button or electrical limit switch directly driving a mechanical relay). Instead, it is preferred that the switching between these settings be performed under computerized control of the VSCU unit 100 responsive to its multi-sensor readings, its programming (optionally in conjunction with externally provided commands/data provided over a data network), and/or the above-described "ring rotation" and "inward click" user inputs.

The VSCU unit 100 comprises physical hardware and firmware configurations, along with hardware, firmware, and software programming that is capable of carrying out the functionalities described explicitly herein or in one of the commonly assigned incorporated applications. In view of the instant disclosure, a person skilled in the art would be able to realize the physical hardware and firmware configurations and the hardware, firmware, and software programming that embody the physical and functional features described herein without undue experimentation using publicly available hardware and firmware components and known programming tools and development platforms. Similar comments apply to described devices and functionalities extrinsic to the VSCU unit 100, such as devices and programs used in remote data storage and data processing centers that receive data communications from and/or that provide data communications to the VSCU unit 100. By way of example, references hereinbelow to machine learning and mathematical optimization algorithms, as carried out respectively by the VSCU unit 100 in relation to home occupancy prediction and setpoint optimization, for example, can be carried out using one or more known technologies, models, and/or mathematical strategies including, but not limited to, artificial neural networks, Bayesian networks, genetic programming, inductive logic programming, support vector machines, decision tree learning, clustering analysis, dynamic programming, stochastic optimization, linear regression, quadratic regression, binomial regression, logistic regression, simulated annealing, and other learning, forecasting, and optimization techniques.

Figure 2A:
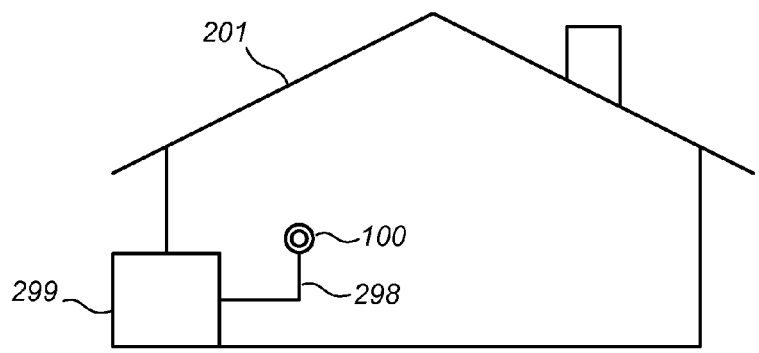
FIG. 2A illustrates the VSCU unit as installed in a house having an HVAC system and a set of control wires extending therefrom.

FIG. 2A illustrates the VSCU unit 100 as installed in a house 201 having an HVAC system 299 and a set of control wires 298 extending therefrom. The VSCU unit 100 is, of course, extremely well suited for installation by contractors in new home construction and/or in the context of complete HVAC system replacement. However, one alternative key business opportunity leveraged according to one embodiment is the marketing and retailing of the VSCU unit 100 as a replacement thermostat in an existing homes, wherein the customer (and/or an HVAC professional) disconnects their old thermostat from the existing wires 298 and substitutes in the VSCU unit 100.

In either case, the VSCU unit 100 can advantageously serve as an "inertial wedge" for inserting an entire energy-saving technology platform into the home. Simply stated, because most homeowners understand and accept the need for home to have a thermostat, even the most curmudgeonly and techno-phobic homeowners will readily accept the simple, non-intimidating, and easy-to-use VSCU unit 100 into their homes. Once in the home, of course, the VSCU unit 100 will advantageously begin saving energy for a sustainable planet and saving money for the homeowner, including the curmudgeons. Additionally, however, as homeowners "warm up" to the VSCU unit 100 platform and begin to further appreciate its delightful elegance and seamless operation, they will be more inclined to take advantage of its advanced features, and they will furthermore be more open and willing to embrace a variety of compatible follow-on products and services as are described further hereinbelow. This is an advantageous win-win situation on many fronts, because the planet is benefiting from the propagation of energy-efficient technology, while at the same time the manufacturer of the VSCU unit and/or their authorized business partners can further expand their business revenues and prospects. For clarity of disclosure, the term "VSCU Efficiency Platform" refers herein to products and services that are technologically compatible with the VSCU unit 100 and/or with devices and programs that support the operation of the VSCU unit 100.

Some implementations of the VSCU unit 100 incorporate one or more sensors to gather data from the environment associated with the house 201. Sensors incorporated in VSCU unit 100 may detect occupancy, temperature, light and other environmental conditions and influence the control and operation of HVAC system 299. VSCU unit 100 uses a grille member (not shown in FIG. 2A) implemented in accordance with the present invention to cover the sensors. In part, the grille member of the present invention adds to the appeal and attraction of the VSCU unit 100 as the sensors in the VSCU unit 100 do not protrude, or attract attention from occupants of the house 201 and the VSCU unit 100 fits with almost any decor. Keeping sensors within the VSCU unit 100 also reduces the likelihood of damage and loss of calibration during manufacture, delivery, installation or use of the VSCU unit 100. Yet despite covering these sensors, the specialized design of the grille member facilitates accurately gathering occupancy, temperature and other data from the environment. Further details on this design and other aspects of the grille member are also described in detail later herein.

Figure 2B:
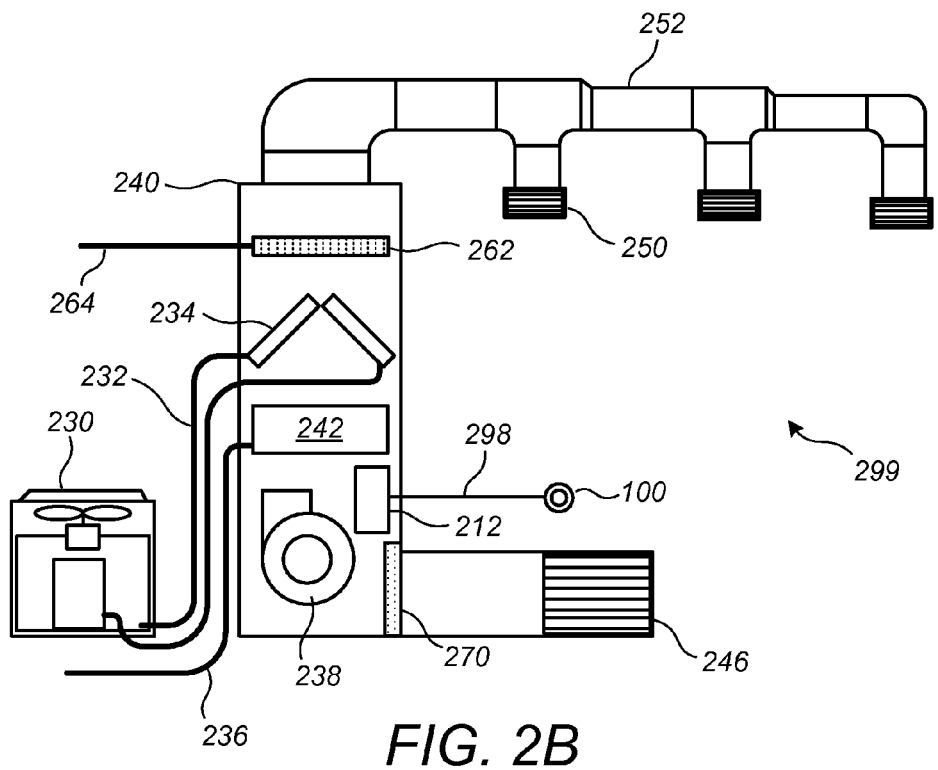
FIG. 2B illustrates an exemplary diagram of the HVAC system of FIG. 2A.

FIG. 2B illustrates an exemplary diagram of the HVAC system 299 of FIG. 2A. HVAC system 299 provides heating, cooling, ventilation, and/or air handling for an enclosure, such as the single-family home 201 depicted in FIG. 2A. The HVAC system 299 depicts a forced air type heating system, although according to other embodiments, other types of systems could be used. In heating, heating coils or elements 242 within air handler 240 provide a source of heat using electricity or gas via line 236. Cool air is drawn from the enclosure via return air duct 246 through filter 270 using fan 238 and is heated by the heating coils or elements 242. The heated air flows back into the enclosure at one or more locations through a supply air duct system 252 and supply air grills such as grill 250. In cooling, an outside compressor 230 passes a gas such as Freon through a set of heat exchanger coils to cool the gas. The gas then goes via line 232 to the cooling coils 234 in the air handlers 240 where it expands, cools and cools the air being circulated through the enclosure via fan 238. According to some embodiments a humidifier 262 is also provided which moistens the air using water provided by a water line 264. Although not shown in FIG. 2B, according to some embodiments the HVAC system for the enclosure has other known components such as dedicated outside vents to pass air to and from the outside, one or more dampers to control airflow within the duct systems, an emergency heating unit, and a dehumidifier.

The HVAC system is selectively actuated via control electronics 212 that communicate with the VSCU unit 100 over control wires 298. Thus, for example, as known in the art, for a typical simple scenario of a four-wire configuration in which the control wires 298 consist of power (R), heat (W), cool (Y), and fan (G), the VSCU unit 100 will short-circuit W to R to actuate a heating cycle (and then disconnect W from R to end the heating cycle), will short-circuit Y to R to actuate a cooling cycle (and then disconnect Y from R to end the cooling cycle), and will short-circuit G to R to turn on the fan (and then disconnect G from R to turn off the fan). For a heating mode, when VSCU unit 100 determines that an ambient temperature is below a lower threshold value equal to a setpoint temperature minus a swing value, the heating cycle will be actuated until the ambient temperature rises to an upper threshold value equal to the setpoint value plus the swing value. For a cooling mode, when VSCU unit 100 determines that an ambient temperature is above an upper threshold value equal to a setpoint temperature plus a swing value, the cooling cycle will be actuated until the ambient temperature lowers to a lower threshold value equal to the setpoint value minus the swing value. Without limitation, the swing values for heating and cooling can be the same or different, the upper and lower swing amounts can be symmetric or asymmetric, and the swing values can be fixed, dynamic, or user-programmable, all without departing from the scope of the present teachings.

FIGS. 3A-3K illustrate user temperature adjustment based on rotation of the outer ring 106 along with an ensuing user interface display according to one embodiment. For one embodiment, prior to the time depicted in FIG. 3A in which the user has walked up to the VSCU unit 100, the VSCU unit 100 has set the circular display monitor 102 to be entirely blank ("dark"), which corresponds to a state of inactivity when no person has come near the unit. As the user walks up to the display, their presence is detected by one or more sensors in the VSCU unit 100 (e.g., via a motion sensor) at which point the circular display monitor 102 is automatically turned on.

When this happens, as illustrated in FIG. 3A, the circular display monitor 102 (e.g., an electronic display) displays a digital numerical representation of the current setpoint in a large font at a center readout 304. The representation may be rounded to the nearest degree F. (or half-degree C.), or otherwise include a different number of significant digits as compared to an actual internally used current setpoint temperature.

Also displayed is a setpoint icon 302 disposed along a periphery of the circular display monitor 102 at a location that is spatially representative the current setpoint. Although it is purely electronic, the setpoint icon 302 is reminiscent of older mechanical thermostat dials, and advantageously imparts a feeling of familiarity for many users as well as a sense of tangible control.

Notably, the example of FIG. 3A assumes a scenario for which the actual current temperature of 68 is equal to the setpoint temperature of 68 when the user has walked up to the VSCU unit 100. For a case in which the user walks up to the VSCU unit 100 when the actual current temperature is different than the setpoint temperature, the display would also include an actual temperature readout and a trailing icon, which are described further below in the context of FIGS. 3B-3K.

Referring now to FIG. 3B, as the user turns the outer ring 106 clockwise, a digital numerical representation of the increasing value of the setpoint temperature is instantaneously provided at the center readout 304, and the setpoint icon 302 moves in a clockwise direction around the periphery of the circular display monitor 102 to a location representative of the increasing setpoint. Thus, a user receives instant feedback about an effect of his rotation and may thus tailor a degree of his ring rotation accordingly. Relationships between ring rotations and selection options may be pre-established. For example, there may be a constant or non-constant relationship between a degree of ring rotation and a change in temperature setpoints. Defining the relationship based on angular rotation rather than an absolute angular position allows for the ring to easily be used for multiple variable options.

Whenever the actual current temperature is different than the setpoint temperature, a representation (e.g., a digital numeric representation) of an actual temperature readout 306 is provided in relatively small digits along the periphery of the circular a location spatially representative the actual current temperature. Further provided is a trailing icon 308, which could alternatively be termed a tail icon or difference-indicating, that extends between the location of the actual temperature readout 306 and the setpoint icon 302. Further provided is a time-to-temperature readout 310 that is indicative of a prediction, as computed by the VSCU unit 100, of the time interval required for the HVAC system to bring the temperature from the actual current temperature to the setpoint temperature.

FIGS. 3C-3K illustrate views of the circular display monitor 102 at exemplary instants in time after the user setpoint change that was completed in FIG. 3B (assuming, of course, that the circular display monitor 102 has remained active, such as during a preset post-activity time period, responsive to the continued proximity of the user, or responsive the detected proximity of another occupant). Thus, at FIG. 3C, the current actual temperature is about halfway up from the old setpoint to the new setpoint, and in FIG. 3D the current actual temperature is almost at the setpoint temperature. As illustrated in FIG. 3E, both the trailing icon 308 and the actual temperature readout 306 disappear when the current actual temperature reaches the setpoint temperature and the heating system is turned off. Then, as typically happens in home heating situations, the actual temperature begins to sag (FIG. 3F) until the permissible temperature swing is reached (which is 2 degrees in this example, see FIG. 3G), at which point the heating system is again turned on and the temperature rises to the setpoint (FIGS. 3H-3I) and the heating system is turned off. The current actual temperature then begins to sag again (FIGS. 3J-3K), and the cycle continues. Advantageously, by virtue of the user interface functionality of FIGS. 3A-3K including the time-to-temperature readout 310, the user is provided with a fast, intuitive, visually pleasing overview of system operation, as well as a quick indication of how much longer the heating system (or cooling system in counterpart embodiments) will remain turned on. It is to be appreciated that the use of 2 degrees as the permissible temperature swing in FIGS. 3C-3K is only for purposes of example, and that different amounts of permissible temperature swing may be applicable at different times according to the particular automated control algorithms, defaults, user settings, user overrides, etc. that may then be in application at those times.

Figure 4A:
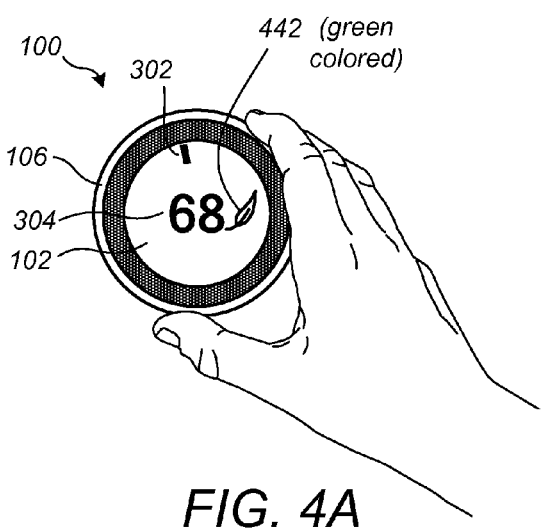
FIGS. 4A-4D illustrates a dynamic user interface for encouraging reduced energy use according to a preferred embodiment.
Figure 4B:
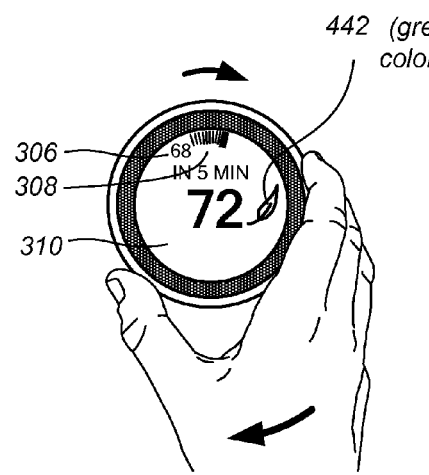
Figure 4C:
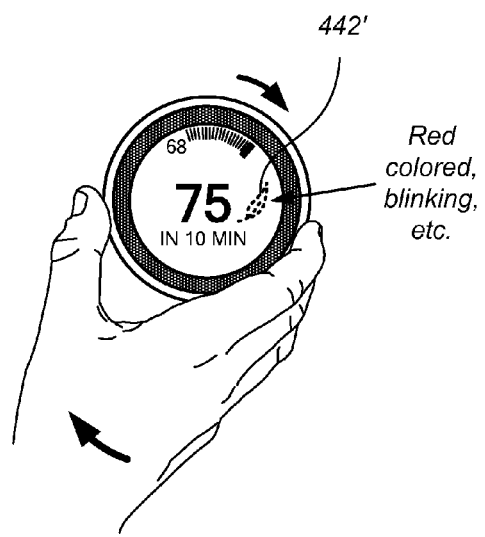
Figure 4D:
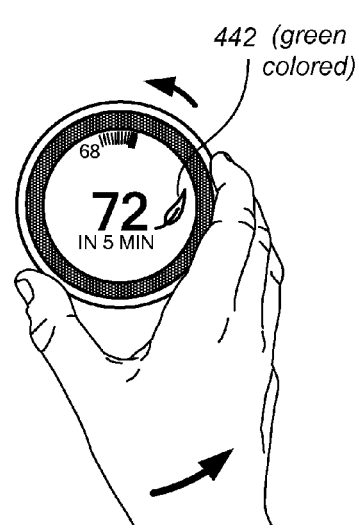

In some embodiments, user interactions with the VSCU unit 100 by virtue of manipulations of the outer ring 106 are analyzed and non-numeric indicators (e.g., related to environmental favorability of the action) are presented to the user. FIGS. 4A-D illustrate a dynamic user interface for encouraging reduced energy use according to a preferred embodiment. The method of FIGS. 4A-D are preferably incorporated into the time-to-temperature user interface method of FIGS. 3A-3K, supra, although the scope of the present teachings is not so limited. As would be readily appreciated by a person skilled in the art, disclosure relating to the heating context could similarly apply to a cooling context. Where, as in FIG. 4A, the heating setpoint is currently set to a value known to be within a first range known to be good or appropriate for energy conservation, a pleasing positive-reinforcement icon such as the green leaf 442 is displayed. As the user turns up the heat (see FIG. 4B) the green leaf continues to be displayed as long as the setpoint remains in that first range. However, as the user continues to turn up the setpoint to a value greater than the first range (see FIG. 4C), there is displayed a negatively reinforcing icon indicative of alarm, consternation, concern, or other somewhat negative emotion, such icon being, for example, a flashing red version 442' of the leaf, or a picture of a smokestack, or the like. It is believed that the many users will respond to the negatively reinforcing icon 442' by turning the setpoint back down, and as illustrated in FIG. 4D, if the user returns the setpoint to a value lying in the first range, they are "rewarded" by the return of the green leaf 442. Many other types of positive-emotion icons or displays can be used in place of the green leaf 442, and likewise many different negatively reinforcing icons or displays can be used in place of the flashing red leaf 1742', while remaining within the scope of the present teachings.

For one embodiment, the VSCU unit 100 is designed to be entirely silent unless a user has walked up and begun controlling the unit. Advantageously, there are no clicking-type annoyances when the heating or cooling units are activated as with conventional prior art thermostats. Optionally, the VSCU unit 100 can be configured to synthesize artificial audible clicks, such as can be output through a piezoelectric speaker, to provide "tick" feedback as the user dials through different temperature settings. Thus, in some instances, VSCU unit 100 includes an audio output device configured to output synthesized audible ticks through said audio output device in correspondence with user rotation of the outer ring 106.

Via the single outer ring 106, a user may easily be able to perform multiple types of interactions with the VSCU unit 100. For example, as described above, the user may be able to set a setpoint temperature value. Other types of interactions may additionally be performed using the rotating and clicking features of the same outer ring 106. A selection component (e.g., ring 106) and electronic display 102 may enable a user to, e.g.: (1) identify a type of variable to be set or information to be input; and/or (2) identify a value for one or more variables and/or for one or more information fields.

For example, an HVAC system may include a plurality of variable categories (e.g., energy, schedule, settings, heating/cooling mode, etc.). As described in greater detail below, display 102 may be configured to present a circular menu: as the user rotates outer ring 106, a different category may appear at or near a top of the display. A user may select a particular type of category by clicking outer ring 106. Selection of some categories allows a user to view available sub-menus. For example, rotation of outer ring 106 may cause an apparent translation of the entire screen, such that a first sub-menu moves off of the screen as a second sub-menu moves on to the screen. In some instances, the user may be able to instantly interact with the displayed sub-menu even without clicking ring 106.

Each variable and/or information field may be defined by a value. The value may include, e.g., a numeric value (e.g., a setpoint-temperature variable is set at "75"), a word (e.g., a password is set as "Password"), a letter (e.g., a thermostat is identified as Thermostat "A"), a selection amongst a plurality of options (e.g., smart learning is "Enabled"), etc. An active variable/field may be identified based on a user's selection of the variable/field, a default thermostat state and/or other information.

Various value options may then be presented to the user. For example, a list of options may be presented in a grid-like fashion on the display, and a user may move a highlighted option by rotating outer ring 106. As another example, alphanumeric characteristics may be arcuately presented around an outer border of electronic display 316. In some embodiments, the options are indicatively presented (e.g., by presenting a series of tick marks, representing options of evenly spaced values), and one or more options (e.g., a highlighted option) may be expressly presented (e.g., by displaying a value of the highlighted option at or near a center of the display). A user may rotate outer ring 106 until a desired option is highlighted. When a selection is highlighted, the selection may be confirmed by an inward click input on the outer ring 106.

FIGS. 5A-5C show example screens of an interactive thermostat menuing system include a rotatable main menu, according to some preferred embodiments. As described in further detail below, the menuing system may be accessible to a user by an inward pressing of ring 106 (i.e. an inward click), and the user may be able to navigate through the menuing system by virtue of rotations and inward clicks of the outer ring 106.

The screens shown, according to some embodiments, are displayed on a thermostat 100 on a round dot-matrix electronic display 102 having a rotatable ring 106. FIG. 5A shows an example screen 500 in normal operations. An inward click from the normal display screen 500 causes a circumferential main menu 520 to appear as shown in screen 501. In this example the main menu 520 displays about the perimeter of the circular display area various menu names such as "SETTINGS," "ENERGY," "SCHEDULE," "AWAY," "DONE," as well one or more icons. The top of the circular menu 520 includes an active window 522 that shows the user which menu item will be selected if an inward click is performed at that time. Window 522 is highlighted, filled in, circumscribed, or otherwise marked such that a user can easily identify that a menu item within this window is active.

Upon user rotation of the rotatable ring 106 (see FIG. 3A, supra) the menu items turn clockwise or counter clockwise, matching the direction of the rotatable ring 106, so as to allow different menu items to be selected. For example, screen 502 and 504 show examples displayed in response to a clockwise rotation of the rotatable ring 106. One example of a rotating menu that rotates responsive to ring rotations according to some embodiments is illustrated in the commonly assigned U.S. Ser. No. 29/399,632, supra. From screen 504, if an inward click is performed by the user, then the Settings menu is entered. It has been found that a circular rotating menu such as shown, when combined with a rotatable ring and round display area, allows for highly intuitive and easy input, and so therefore greatly enhances the user interface experience for many users.

Menu items may include text (e.g., "Schedule") and/or icons (e.g., disks 510 and 512). FIG. 5B shows an example screen 506 that allows for the schedule mode to be entered. FIG. 5C shows the selection of a mode icon 509 representing a heating/cooling/off mode screen, the mode icon 509 comprising two disks 510 and 512 and causing the display of a mode menu if it appears in the active window 522 when the user makes an inward click. In screen 508, a small blue disk 510 represents cooling mode and a small orange-red disk 512 represents heating mode. According to some embodiments the colors of the disks 510 and 512 match the background colors used for the thermostat, as described in greater detail below.

Menu items may further indicate a currently active selection or mode of operation. For example, one of disks 510 and 512, in this case the heating disk 512, is highlighted with a colored outline, to indicate the current operating mode (i.e. heating or cooling) of the thermostat. In one alternative embodiment, the mode icon 509 can be replaced with the text string "HEAT/COOL/OFF" or simply the word "MODE".

If in inward click is performed from screen 508, a menu screen 514 appears (e.g. using a "coin flip" transition). In screen 514 the user can view the current mode (marked with a check mark). Screen 514 illustrates another way in which rotatable ring 106 may be used to make a selection. A plurality of selection options may be presented, with one or more options being emphasized (e.g., highlighted). A user may highlight a different option by rotating rotatable ring 106. For example, as a user rotates rotatable ring 106 in a clockwise fashion, options further down the list become highlighted. Once the user is satisfied that the desired option is highlighted, they may click the ring to confirm the selection. Thus, in the example shown in screen 514, a user may rotate rotatable ring 106 clockwise to move the highlighting from "HEAT" to "COOL" or "OFF." The user may then establish the selection by clicking the ring, and thereby change the mode. If "COOL" is selected then the thermostat will change over to cooling mode (such changeover as might be performed in the springtime), and the cooling disk icon will highlighted on screens 514 and 508. The menu can also be used to turn the thermostat off by selecting "OFF." In cases the connected HVAC system only has heating or cooling but not both, the words "HEAT" or "COOL" or "OFF" are displayed on the menu 520 instead of the colored disks.

Figure 6A:
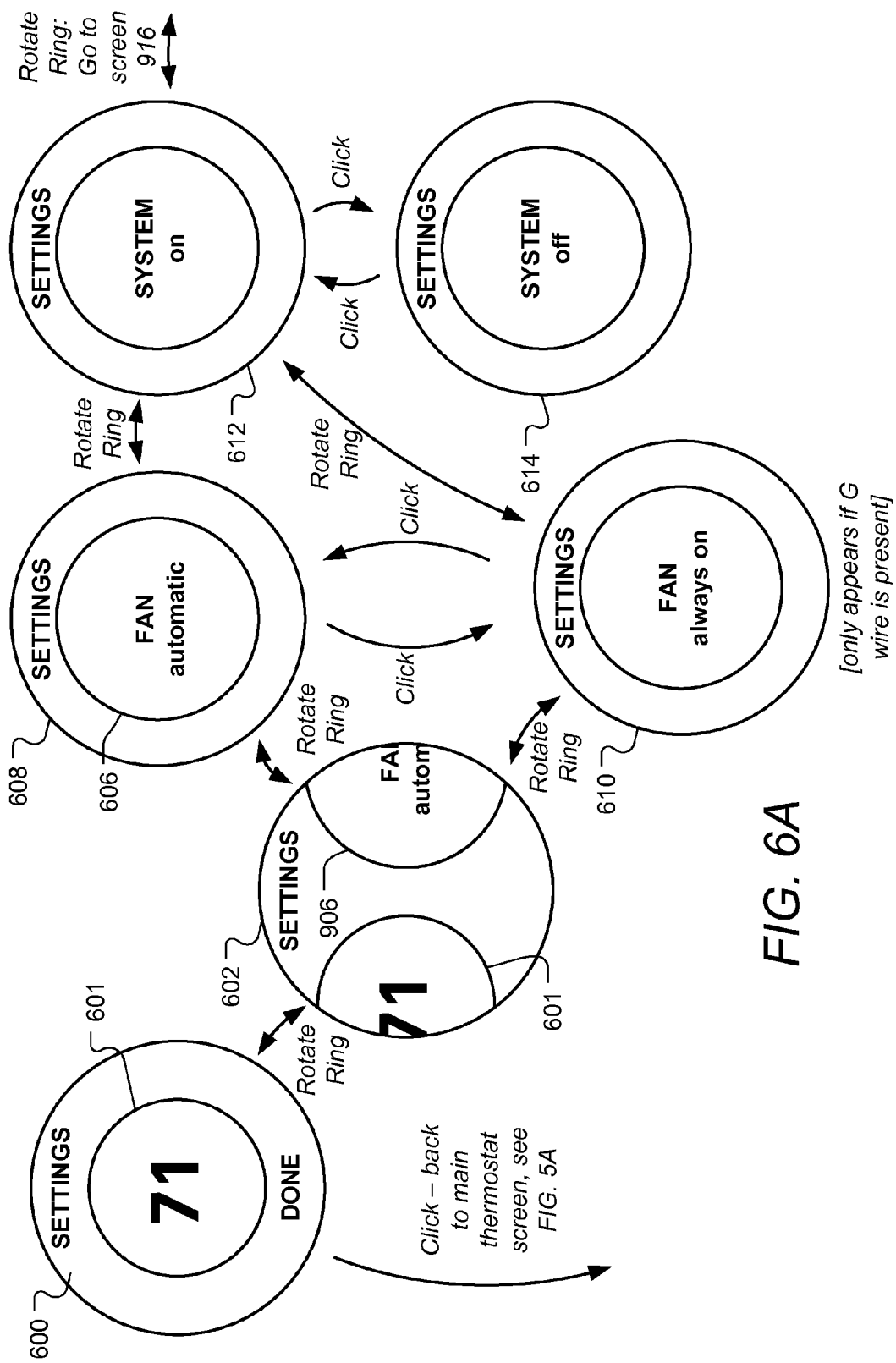
FIGS. 6A-6B illustrate example user interface screens on a user-friendly programmable thermostat for making various settings, according to some embodiments.
Figure 6B:
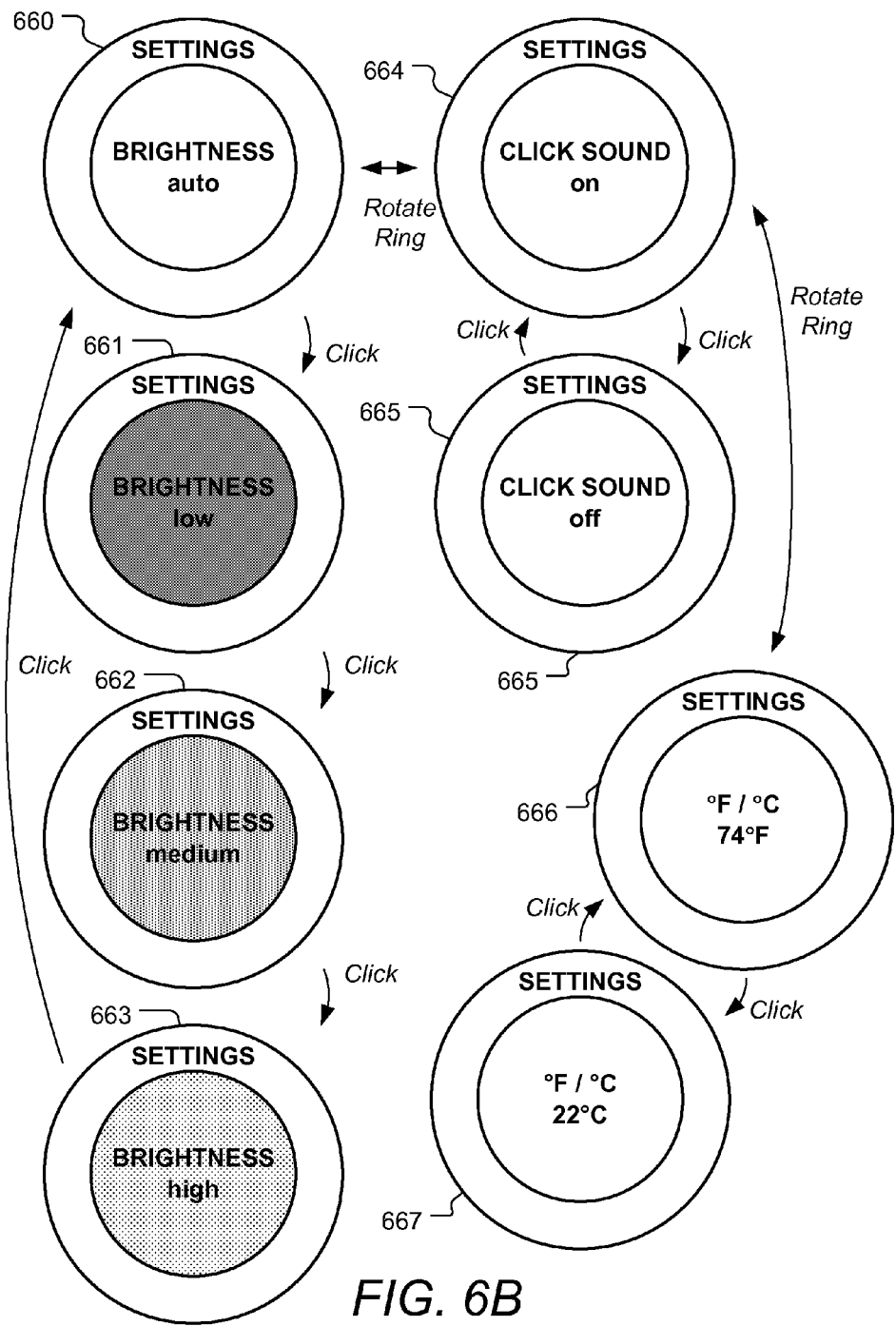

FIGS. 6A-6B and FIGS. 7A-7C further illustrate possible operation and versatile uses of outer ring 106. FIGS. 6A-6B illustrate example user interface screens for making various settings, according to some embodiments. The screens shown, according to some embodiments, are displayed on a thermostat 100 on a round dot-matrix electronic display 102 having a rotatable ring 106. In FIG. 6A, screen 600 is initially displayed following a user selection of "SETTINGS" from the main menu, such as shown in screen 504 of FIG. 5A. The general layout of the settings menu in this example is a series of sub-menus that are navigated using the rotatable ring 106. For example, with reference to FIG. 6A, the user can cause the initial screen 600 to be shifted or translated to the left by a clockwise rotation of the rotatable ring 106, as shown in the succession of screens 602 and 608. The animated translation or shifting effect is illustrated in FIG. 6A by virtue of a portion of the previous screen disk 601 and a portion of the new screen disk 606 shifting as shown, and is similar to the animated shifting translation illustrated in the commonly assigned U.S. Ser. No. 29/399,621, supra. Further rotation of the ring leads to successive sub-menu items such as "system on" screen 612, and lock setting screen 616 (see FIG. 6B). Rotating the ring in the opposite direction, i.e., counterclockwise, translates or shifts the screens in the opposite direction (e.g., from 616 to 608 to 600). The "initial screen" 600 is thus also used as a way to exit the settings menu by an inward click. This exit function is also identified by the "DONE" label on the screen 600. Note that inner disk 601 shows the large central numerals that correspond to the current setpoint temperature and can include a background color to match the thermostat background color scheme, so as to indicate to a user, in an intuitive way, that this screen 600 is a way of exiting the menu and going "back" to the main thermostat display. According to some embodiments, another initial/done screen such as screen 600 is displayed at the other end (the far end) of the settings menu, so as to allow means of exit from the settings menu from either end. According to some embodiments, the sub-menus are repeated with continued rotation in one direction, so that they cycle through in a circular fashion and thus any sub menu can eventually be accessed by rotating the ring continuously in either one of the two directions.

Screen 608 has a central disk 606 indicating the name of the sub-menu, in this case the Fan mode. Some sub menus only contain a few options which can be selected or toggled among by inward clicking alone. For example, the Fan sub-menu 608 only has two settings "automatic" (shown in screen 608) and "always on" (shown in screen 610). In this case the fan mode is changed by inward clicking, which simply toggles between the two available options. Ring rotation shifts to the next (or previous) settings sub-menu item. Thus rotating the ring from the fan sub-menu shift to the system on/off sub-menu shown in screens 612 (in the case of system "ON") and 614 (in the case of system "OFF"). The system on/off sub-menu is another example of simply toggling between the two available options using the inward click user input.

FIG. 6B shows sub-menu screen examples for settings for brightness, click sounds and Celsius/Fahrenheit units, according to some embodiments. Screens 660, 661, 662 and 663 toggle among four different brightness settings using the inward click input as shown in FIG. 6B. Specifically, the settings for auto-brightness, low, medium and high can be selected. According to some embodiments, the brightness of the display is changed to match the current selection so as to aid the user in selecting an appropriate brightness setting. Screens 664 and 665 toggle between providing, and not providing, audible clicking sounds as the user rotates the rotatable ring 106, which is a form of sensory feedback that some users prefer and other users do not prefer.

Screens 666 and 667 are used to toggle between Celsius and Fahrenheit units, according to some embodiments. According to some embodiments, if Celsius units is selected, then half-degrees are displayed by the thermostat when numerical temperature is provided (for example, a succession of 21, 215, 22, 225, 23, 235, and so forth in an example in which the user is turning up the rotatable ring on the main thermostat display). According to another embodiment, there is another sub-menu screen disk (not shown) that is equivalent to the "Brightness" and "Click Sound" disks in the menu hierarchy, and which bears one of the two labels "SCREEN ON when you approach" and "SCREEN ON when you press," the user being able to toggle between these two options by an inward click when this disk is displayed. When the "SCREEN ON when you approach" is active, the proximity sensor-based activation of the electronic display screen 102 is provided (as described above with the description accompanying FIG. 5C), whereas when the "SCREEN ON when you press" option is selected, the electronic display screen 102 does not turn on unless there is a ring rotation or inward click.

Figure 7A:
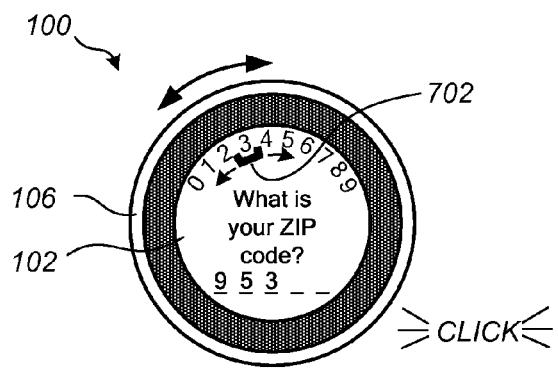
FIG. 7A illustrates a data input functionality provided by the user interface of the VSCU unit according to an embodiment.

FIG. 7A illustrates a data input functionality provided by the user interface of the VSCU unit 100 according to an embodiment, for a particular non-limiting example in which the user is asked, during a congenial setup interview (which can occur at initial VSCU unit installation or at any subsequent time that the user may request), to enter their ZIP code. Responsive to a display of digits 0-9 distributed around a periphery of the circular display monitor 102 along with a selection icon 702, the user turns the outer ring 106 to move the selection icon 702 to the appropriate digit, and then provides an inward click command to enter that digit. In some embodiments, the menuing system that is navigated by virtue of ring rotations and ring inward clicks may be configured to further allow the user to: provide the unit with information necessary to connect to an Internet network; provide an address; provide a current date; provide a type of location (home versus business); provide occupancy patterns; provide information about heating/cooling equipment; identify qualitative or quantitative heating or cooling preferences (e.g., heating or cooling temperatures when away); set a password; scheduling learning; set a brightness, sound or unit property; initiate an equipment test; and/or view select informational content (e.g., how to set up wiring). Additional detail related to the types of interactions that may be enabled by the outer ring 106 is provided in U.S. Ser. No. 13/269,501.

For one embodiment, the VSCU unit 100 is programmed to provide a software lockout functionality, wherein a person is required to enter a password or combination before the VSCU unit 100 will accept their control inputs. The user interface for password request and entry can be similar to that shown in FIG. 7A. The software lockout functionality can be highly useful, for example, for Mom and Dad in preventing their teenager from making unwanted changes to the set temperature, for various landlord-tenant scenarios, and in a variety of other situations.

Figure 7B:
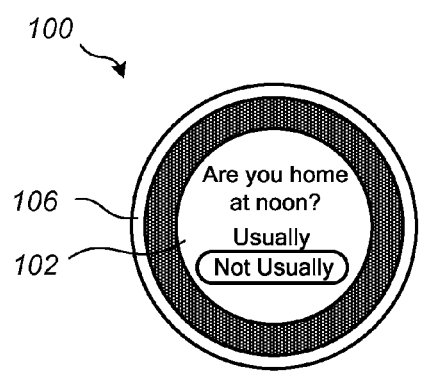
FIGS. 7B-7C illustrate a similar data input functionality provided by the user interface of the VSCU unit for answering various questions during the set up interview.
Figure 7C:
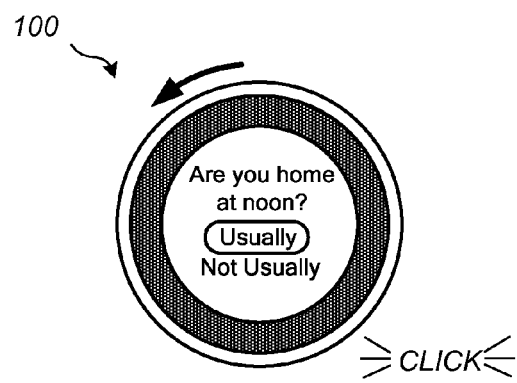

FIGS. 7B-7C illustrate a similar data input functionality provided by the user interface of the VSCU unit 100 for answering various questions during the set up interview. The user rotates the outer ring 106 until the desired answer is highlighted, and then provides an inward click command to enter that answer.

Thus, as exemplified in FIGS. 3-7, the menuing system as navigated by outer-ring rotations and inward clicks may be used to receive many types of user inputs. The menuing system may further be configured to receive variable inputs from a user. For example, a menu may be displayed subsequent to a click on the ring, and a user may be able to navigate between variables (e.g., a menu, a sub-menu, a setpoint, a setting, etc.) using the outer ring 106. As another example, a double click on the ring may allow a user to view and select between various types of settings (e.g., single setpoints, time-dependent setpoints, user profiles, etc.). These advanced opportunities may nevertheless remain hidden from a user wishing to enter only the most simple information.

Figure 8A:
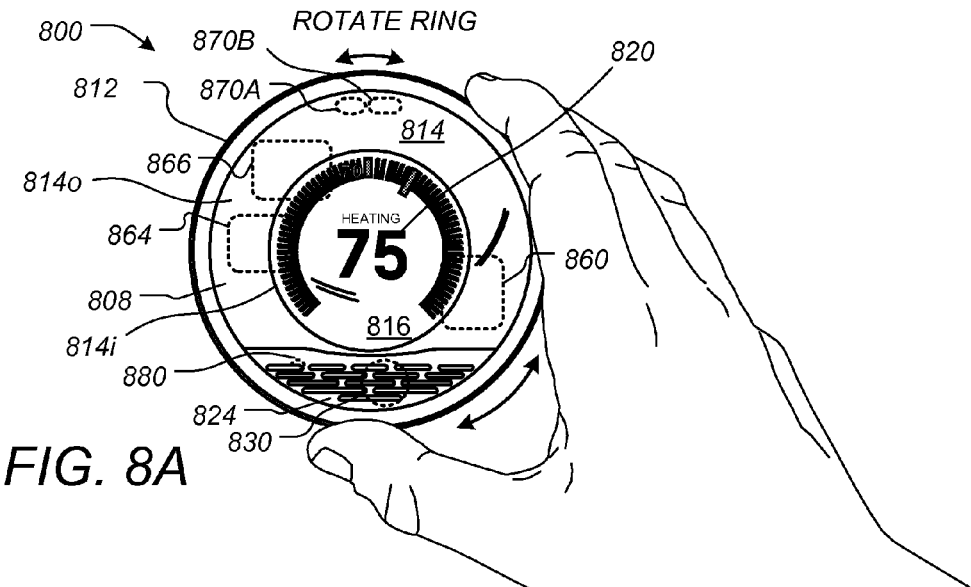
FIGS. 8A-8B illustrate a thermostat having a user-friendly interface, according to some embodiments.
Figure 8B:
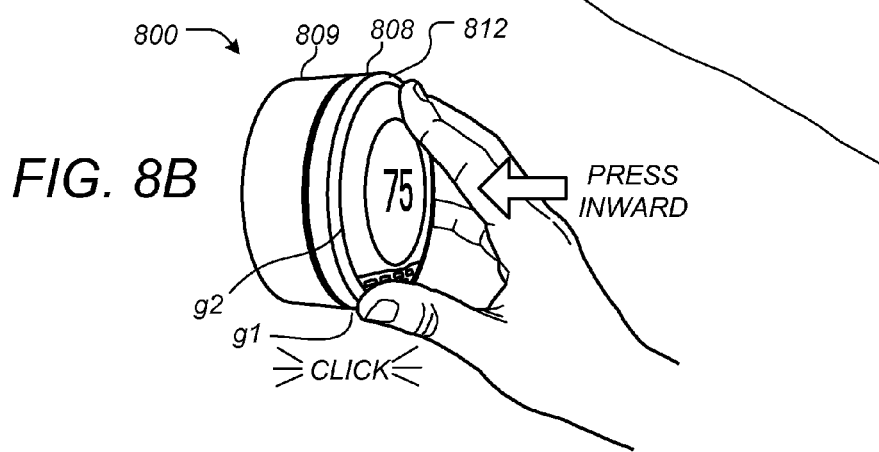

FIGS. 8A-B illustrate a thermostat 800 having a user-friendly interface, according to some embodiments. Unlike many prior art thermostats, thermostat 800 preferably has a sleek, simple, uncluttered and elegant design that does not detract from home decoration, and indeed can serve as a visually pleasing centerpiece for the immediate location in which it is installed. Moreover, user interaction with thermostat 800 is facilitated and greatly enhanced over known conventional thermostats by the design of thermostat 800. The thermostat 800 includes control circuitry and is electrically connected to an HVAC system, such as is shown with unit 100 in FIGS. 1 and 2. Thermostat 800 is wall mounted, is circular in shape, and has an outer rotatable ring 812 for receiving user input. Thermostat 800 is circular in shape in that it appears as a generally disk-like circular object when mounted on the wall. Thermostat 800 has a large front face lying inside the outer ring 812. According to some embodiments, thermostat 800 is approximately 80 mm in diameter.

The outer rotatable ring 812 allows the user to make adjustments, such as selecting a new target temperature. For example, by rotating the outer ring 812 clockwise, the target temperature can be increased, and by rotating the outer ring 812 counter-clockwise, the target temperature can be decreased. The thermostat 800 may be configured to receive a plurality of types of inputs by virtue of the rotatable ring 812, such as a scrolling input and a selection input. For example, a rotation of the ring may allow a user to scroll through an array of selection options, and inwards pressure exerted on the ring (inward click) may allow a user to select one of the options (e.g., corresponding to a particular scroll position).

The outer rotatable ring 812 may include a component that may be physically rotated, or, in other embodiments, a static component that may sense a user's virtual rotation of the ring. For some embodiments, the outer rotatable ring 812 may include a touch pad configured to track arcuate motion of a user's finger on the touch pad. The touch pad may comprise, e.g., a ring-shaped or circular area. In some instances, the touch pad includes multiple portions (e.g., to detect arcuate motion in a first ring-shaped area and to detect tapping in a second inner circular area). Boundaries of a touch pad area may be identified to a user using, e.g., visual or tactile cues. For example, a ring-shaped touchpad area may be indented compared to neighboring areas on the thermostat 800, or the area may be a different color than neighboring areas.

For preferred embodiments such as those of FIG. 8A in which the outer ring 812 is a continuous loop without fiducial markers, one or more advantages are brought about. Thus, a user may physically rotate the ring (in embodiments in which the ring is configured to be physically rotatable) regardless of a starting position of the ring. Further, a user may select, e.g., a value of a variable (e.g., select a particular menu, a particular setpoint temperature value, etc.) by rotating the ring multiple times. This feature may be particularly advantageous as the user need not worry about precise rotations in order to select a desired option.

The front face of the thermostat 800 comprises a clear cover 814 that according to some embodiments is polycarbonate, and a metallic portion 824 preferably having a number of slots formed therein as shown. According to some embodiments, the surface of cover 814 and metallic portion 824 form a common outward arc or spherical shape gently arcing outward, and this gentle arcing shape is continued by the outer ring 812.

Although being formed from a single lens-like piece of material such as polycarbonate, the cover 814 has two different regions or portions including an outer portion 814o and a central portion 814i. According to some embodiments, the cover 814 is painted or smoked around the outer portion 814o, but leaves the central portion 814i visibly clear so as to facilitate viewing of an electronic display 816 disposed thereunderneath. According to some embodiments, the curved cover 814 acts as a lens that tends to magnify the information being displayed in electronic display 816 to users. According to some embodiments the central electronic display 816 is a dot-matrix layout (individually addressable) such that arbitrary shapes can be generated, rather than being a segmented layout. According to some embodiments, a combination of dot-matrix layout and segmented layout is employed. According to some embodiments, central display 816 is a backlit color liquid crystal display (LCD). An example of information displayed on the electronic display 816 is illustrated in FIG. 8A, and includes central numerals 820 that are representative of a current setpoint temperature.

Particular presentations displayed on the electronic display 816 may depend on detected user input. For example, one of a plurality of variables (e.g., current setpoint temperature versus learning status) or variable values (e.g., 65 degrees versus 75 degrees) may be displayed. The one being displayed may depend on a user's rotation of the outer rotatable ring 812. Thus, for example, when the device is configured to display a current setpoint temperature, the value being displayed may gradually increase as the user rotates the ring in a clockwise direction. The sign of the change in the displayed temperature may depend on whether the user is rotating the ring in a clockwise or counterclockwise direction. The speed at which the displayed temperature is changing may depend (e.g., in a linear manner) on the speed at which the user is rotating the ring.

As described above, a displayed characteristic may vary depending on received user input. For example, a displayed temperature may increase as a user rotates the outer rotatable ring 812 clockwise, or a highlighted indicator may progress across a list of displayed options as the user rotates the ring 812. Further, or additionally, user inputs may cause the appearance of new types of information. For example, if a user is viewing setpoint-temperature options, a dramatic clockwise rotation may cause a flashing red symbol (to convey an anti-environmental message). Thus, a relationship may exist between a single type of user input (e.g., ring rotation) and a change in an active variable (e.g., setpoint temperature changes), and relationships may further exist between the single type of user input and an inactive variable (e.g., an environmental warning flag). The latter relationship may be indirect and depend on a value or change in values of the active variable.

The presentations on the electronic display 816 may depend on one or more types of user input. For example, the display may change in a first manner (e.g., to show a varying selection option) as a user rotates the outer rotatable ring 812 and may change in a second manner (e.g., to confirm a selection or default to a menu screen) as the user exerts inwards pressure on the outer rotatable ring 812.

According to some embodiments, metallic portion 824 has number of slot-like openings so as to facilitate the use of a passive infrared motion sensor 830 mounted thereneath. The metallic portion 824 can alternatively be termed a metallic front grille portion. Further description of the metallic portion/front grille portion is provided in the commonly assigned U.S. Ser. No. 13/199,108, supra. The design of the metallic portion 824 compliments the sleek, simple, uncluttered and elegant design of thermostat 800 while facilitating the integration and operation of sensors located within a housing of the thermostat. In the implementation as illustrated, thermostat 800 is enclosed by housing with a forward-facing surface including the cover 814 and the metallic portion 324. Some implementations of the housing include a back plate and a head unit. The housing provides an attractive and durable configuration for one or more integrated sensors used by thermostat 800 and contained therein. In some implementations, the metallic portion 824 may be flush-mounted with the cover 814 on the forward-facing surface of housing. Together the metallic portion 824 as incorporated in housing does not detract from home or commercial decor, and indeed can serve as a visually pleasing centerpiece for the immediate location in which it is located.

The metallic portion 824 is designed to conceal sensors from view promoting a visually pleasing quality of the thermostat yet permitting them to receive their respective signals. Openings in the metallic portion 824 along the forward-facing surface of the housing allow signals to pass through that would otherwise not pass through the cover 814. For example, glass, polycarbonate or other similar materials used for cover 814 are capable of transmitting visible light but are highly attenuating to infrared energy having longer wavelengths in the range of 10 microns, which is the radiation band of operation for many passive infrared (PIR) occupancy sensors. Notably, included in the thermostat 800, according to some preferred implementations, is an ambient light sensor (not shown) and an active proximity sensor (not shown) positioned near the top of the thermostat just behind the cover 814. Unlike PIR sensors, the ambient light sensor and active proximity sensor are configured to detect electromagnetic energy in the visible and shorter-infrared spectrum bands having wavelengths less than 1 micron, for which the glass or polycarbonate materials of the cover 814 are not highly attenuating. In some implementations, the metallic portion 824 includes openings in accordance with one or more implementations that allow the longer-wavelength infrared radiation to pass through the openings towards a passive infrared (PIR) motion sensor 830 as illustrated. Because the metallic portion 824 is mounted over the radiation receiving surface of PIR motion sensor 830, PIR motion sensor 830 continues to receive the longer wavelength infrared radiation through the openings and detect occupancy in an enclosure.

Additional implementations of the metallic portion 824 also facilitate additional sensors to detect other environmental conditions. The metallic portion may at least partly conceal and/or protect one or more such sensors. In some implementations, the metallic portion 824 helps a temperature sensor situated inside of the thermostat's housing measure the ambient temperature of air. Openings in the metallic portion 824 promote air flow towards a temperature sensor located below the metallic portion 824 thus conveying outside temperatures to the interior of the housing. In further implementations, the metallic portion 824 may be thermally coupled to a temperature sensor promoting a transfer of heat from outside the housing.

The thermostat 800 is preferably constructed such that the electronic display 816 is at a fixed orientation and does not rotate with the outer ring 812, so that the electronic display 816 remains easily read by the user. For some embodiments, the cover 814 and metallic portion 824 also remain at a fixed orientation and do not rotate with the outer ring 812. According to one embodiment in which the diameter of the thermostat 800 is about 80 mm, the diameter of the electronic display 816 is about 45 mm. According to some embodiments an LED indicator 880 is positioned beneath portion 824 to act as a low-power-consuming indicator of certain status conditions. For, example the LED indicator 880 can be used to display blinking red when a rechargeable battery of the thermostat is very low and is being recharged. More generally, the LED indicator 880 can be used for communicating one or more status codes or error codes by virtue of red color, green color, various combinations of red and green, various different blinking rates, and so forth, which can be useful for troubleshooting purposes.

Motion sensing as well as other techniques can be use used in the detection and/or predict of occupancy, as is described further in the commonly assigned U.S. Ser. No. 12/881,430, supra. According to some embodiments, occupancy information is used in generating an effective and efficient scheduled program. Preferably, an active proximity sensor 870A is provided to detect an approaching user by infrared light reflection, and an ambient light sensor 870B is provided to sense visible light. The proximity sensor 870A can be used to detect proximity in the range of about one meter so that the thermostat 800 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place. The ambient light sensor 870B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, the thermostat 800 is controlled by only two types of user input, the first being a rotation of the outer ring 812 as shown in FIG. 8A (referenced hereafter as a "rotate ring" or "ring rotation" input), and the second being an inward push on an outer cap 808 (see FIG. 8B) until an audible and/or tactile "click" occurs (referenced hereafter as an "inward click" or simply "click" input). For the embodiment of FIGS. 8A-8B, the outer cap 808 is an assembly that includes all of the outer ring 812, cover 814, electronic display 816, and metallic portion 824. When pressed inwardly by the user, the outer cap 808 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. Thus, for the embodiment of FIGS. 8A-8B, an inward click can be achieved by direct pressing on the outer ring 812 itself, or by indirect pressing of the outer ring by virtue of providing inward pressure on the cover 814, metallic portion 824, or by various combinations thereof. For other embodiments, the thermostat 800 can be mechanically configured such that only the outer ring 812 travels inwardly for the inward click input, while the cover 814 and metallic portion 824 remain motionless. It is to be appreciated that a variety of different selections and combinations of the particular mechanical elements that will travel inwardly to achieve the "inward click" input are within the scope of the present teachings, whether it be the outer ring 812 itself, some part of the cover 814, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 812 has been found particularly advantageous, since the user's fingers do not need to be lifted out of contact with the device, or slid along its surface, in order to go between ring rotations and inward clicks. Moreover, by virtue of the strategic placement of the electronic display 816 centrally inside the rotatable ring 812, a further advantage is provided in that the user can naturally focus their attention on the electronic display throughout the input process, right in the middle of where their hand is performing its functions. The combination of intuitive outer ring rotation, especially as applied to (but not limited to) the changing of a thermostat's setpoint temperature, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. No. 13/033,573, supra, U.S. Ser. No. 29/386,021, supra, and U.S. Ser. No. 13/199,108, supra.

Figure 8C:
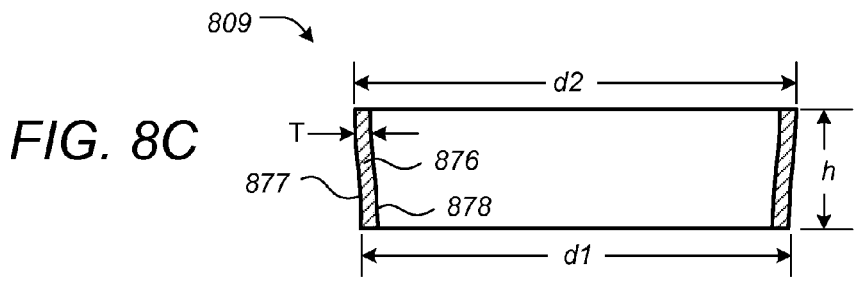
FIG. 8C illustrates a cross-sectional view of a shell portion of a frame of the thermostat of FIGS. 18A-B.

FIG. 8C illustrates a cross-sectional view of a shell portion 809 of a frame of the thermostat of FIGS. 8A-B, which has been found to provide a particularly pleasing and adaptable visual appearance of the overall thermostat 800 when viewed against a variety of different wall colors and wall textures in a variety of different home environments and home settings. While the thermostat itself will functionally adapt to the user's schedule as described herein and in one or more of the commonly assigned incorporated applications, supra, the outer shell portion 809 is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles. The shell portion 809 has the shape of a frustum that is gently curved when viewed in cross-section, and comprises a sidewall 876 that is made of a clear solid material, such as polycarbonate plastic. The sidewall 876 is backpainted with a substantially flat silver- or nickel-colored paint, the paint being applied to an inside surface 878 of the sidewall 876 but not to an outside surface 877 thereof. The outside surface 877 is smooth and glossy but is not painted. The sidewall 876 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension "h" of about 22.5 mm, the diameter change taking place in either a linear fashion or, more preferably, a slightly nonlinear fashion with increasing outward distance to form a slightly curved shape when viewed in profile, as shown in FIG. 8C. The outer ring 812 of outer cap 808 is preferably constructed to match the diameter d2 where disposed near the second end of the shell portion 809 across a modestly sized gap g1 therefrom, and then to gently arc back inwardly to meet the cover 814 across a small gap g2. It is to be appreciated, of course, that FIG. 8C only illustrates the outer shell portion 809 of the thermostat 800, and that there are many electronic components internal thereto that are omitted from FIG. 8C for clarity of presentation, such electronic components being described further hereinbelow and/or in other ones of the commonly assigned incorporated applications, such as U.S. Ser. No. 13/199,108, supra.

According to some embodiments, the thermostat 800 includes a processing system 860, display driver 864 and a wireless communications system 866. The processing system 860 may be disposed within a housing of thermostat 800, coupled to one or more temperature sensors of thermostat 800 and/or coupled to rotatable ring 812. The processing system 860 may be configured to dynamically identify user input via rotatable ring 812, dynamically identifying a variable value (e.g., a setpoint temperature value), and/or dynamically identify an HVAC-control-related property. The processing system 860 may be configured and programmed to provide an interactive thermostat menuing system (e.g., such as the menuing system shown in FIG. 5) on display area 816 responsive to an inward pressing of rotatable ring 812 and/or to provide user navigation within the interactive thermostat menuing system based on rotation of rotatable ring 812 and inward pressing of rotatable ring 812 (e.g., such as is described in relation to FIG. 5). The processing system 860 may be adapted to cause the display driver 864 and display area 816 to display information to the user and/or to receive user input via the rotatable ring 812.

For example, an active variable (e.g., variable-value selection, setpoint selection, zip-code selection) may be determined based on a default state, smart logic or previously received user input. A relationship between the variable and user input may be identified. The relationship may be, e.g., linear or non-linear, continuous or discrete, and/or saturating or non-saturating. Such relationships may be pre-defined and stored within the thermostat. User input may be detected. Analysis of the user input may include, e.g., identifying: a type of user input (tapping versus rotation), a degree of input (e.g., a degree of rotation); a final input position (e.g., a final angular position of the rotatable ring); an input location (e.g., a position of a tapping); and/or a speed of input (e.g., a speed of rotation). Using the relationship, the processing system 860 may then determine a display indicator, such as a digital numerical value representative of an identified value of a variable (e.g., a setpoint temperature). The display indicator may be displayed on display area 816. For example, a digital numerical value representative of a setpoint temperature to be displayed may be determined based on a prior setpoint value and a saturating and continuous relationship between rotation input and the temperature. The displayed value may be, e.g., numeric, textual or graphical.

The processing system 860 may further set a variable value in accordance with a user selection. For example, a particular type of user input (e.g., inwards pressure exertion) may be detected. A value of a selected variable may be determined based on, e.g., a prior ring rotation, displayed variable value, etc. The variable may then be set to this value.

The processing system 860, according to some embodiments, is capable of carrying out the governance of the operation of thermostat 800 including the user interface features described herein. The processing system 860 is further programmed and configured to carry out other operations as described further hereinbelow and/or in other ones of the commonly assigned incorporated applications. For example, processing system 860 is further programmed and configured to maintain and update a thermodynamic model for the enclosure in which the HVAC system is installed, such as described in U.S. Ser. No. 12/881,463, supra. According to some embodiments, the wireless communications system 866 is used to communicate with devices such as personal computers and/or other thermostats or HVAC system components, which can be peer-to-peer communications, communications through one or more servers located on a private network, and/or communications through a cloud-based service.

Figure 9A:
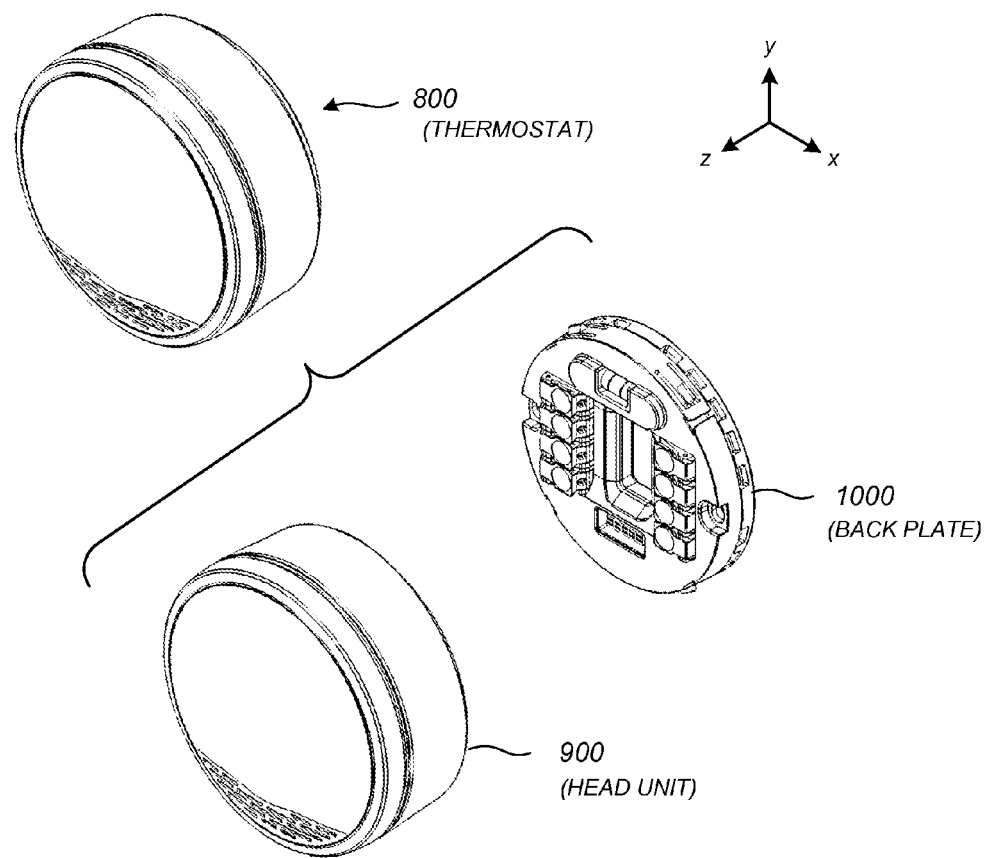
FIGS. 9A-9B illustrate exploded front and rear perspective views, respectively, of a thermostat with respect to its two main components, which are the head unit and the back plate.
Figure 9B:
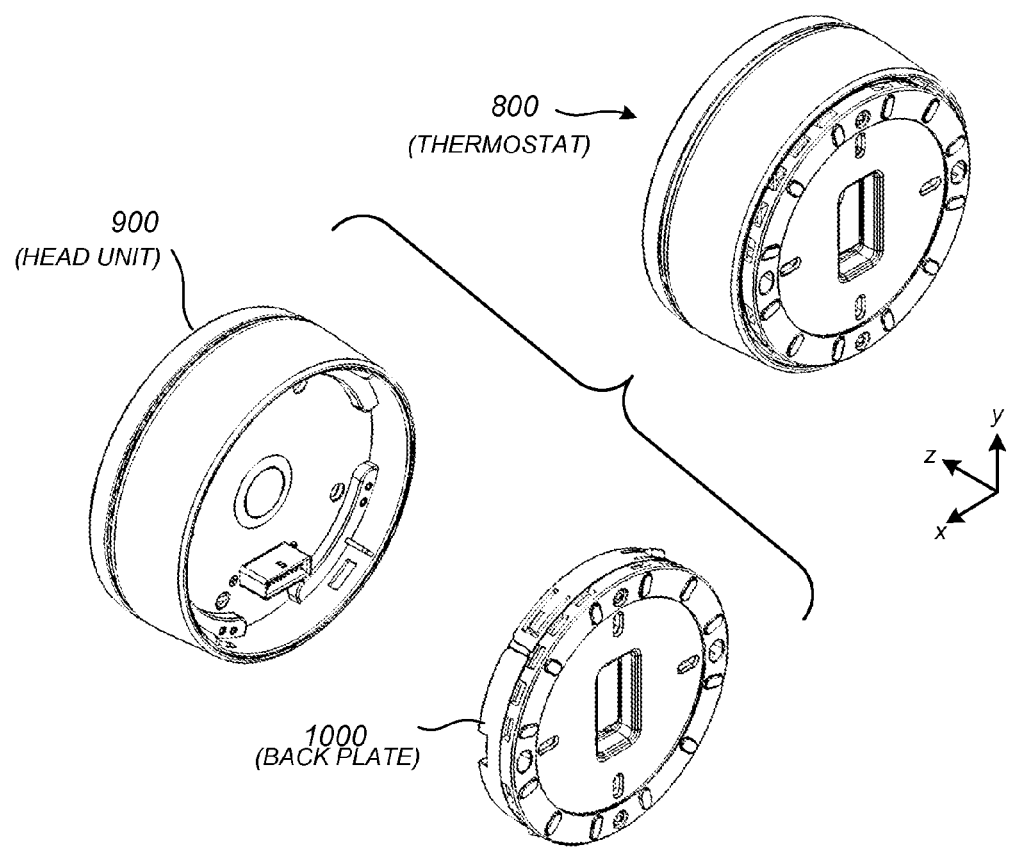

FIGS. 9A-9B illustrate exploded front and rear perspective views, respectively, of the thermostat 800 with respect to its two main components, which are the head unit 900 and the back plate 1000. Further technical and/or functional descriptions of various ones of the electrical and mechanical components illustrated hereinbelow can be found in one or more of the commonly assigned incorporated applications, such as U.S. Ser. No. 13/199,108, supra. In the drawings shown, the "z" direction is outward from the wall, the "y" direction is the head-to-toe direction relative to a walk-up user, and the "x" direction is the user's left-to-right direction.

Figure 10A:
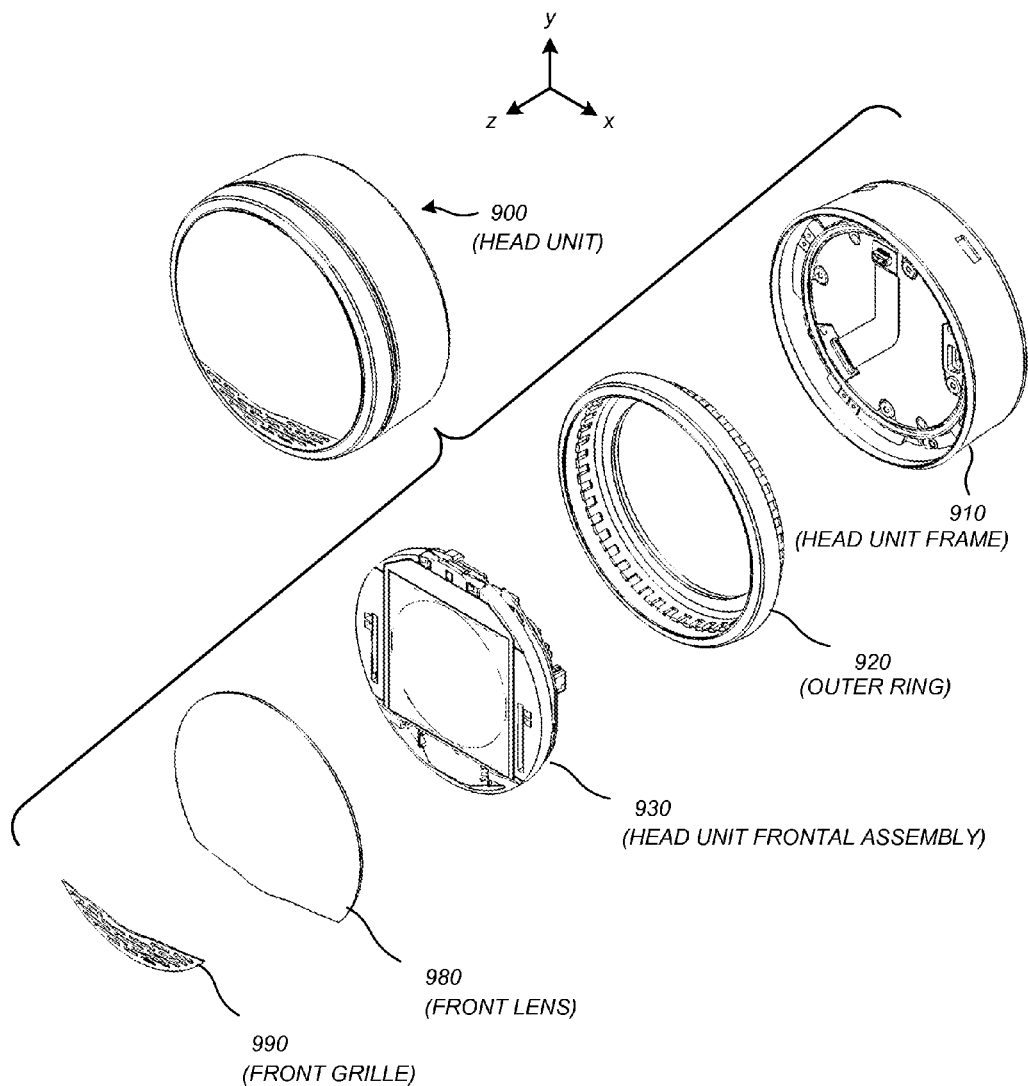
FIGS. 10A-10B illustrate exploded front and rear perspective views, respectively, of the head unit with respect to its primary components.
Figure 10B:
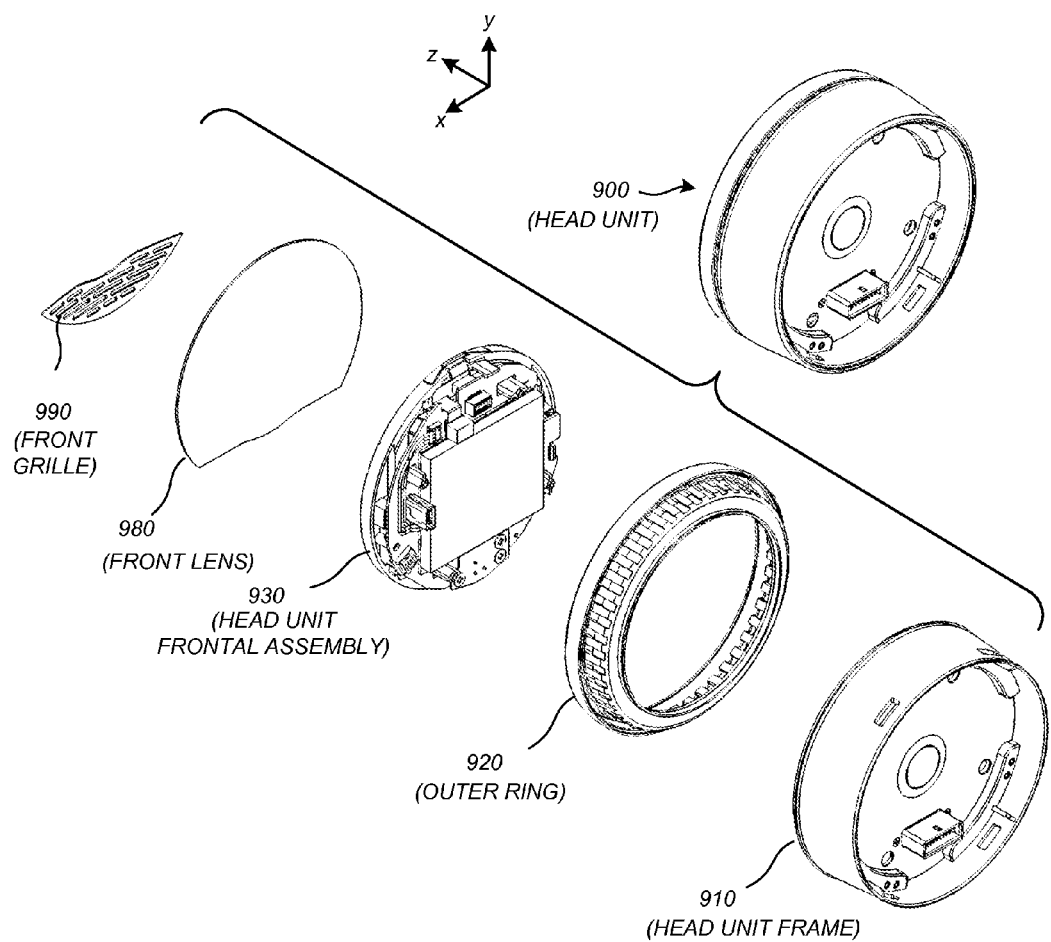

FIGS. 10A-10B illustrate exploded front and rear perspective views, respectively, of the head unit 900 with respect to its primary components. Head unit 900 includes a head unit frame 910, the outer ring 920 (which is manipulated for ring rotations), a head unit frontal assembly 930, a front lens 980, and a front grille 990. Electrical components on the head unit frontal assembly 930 can connect to electrical components on the back plate 1000 by virtue of ribbon cables and/or other plug type electrical connectors. Head unit frontal assembly 930 is slidably mounted and secured to head unit frame urging the outer ring 920 to be held between the head unit frontal assembly 930 and the head unit frame.

Figure 11A:
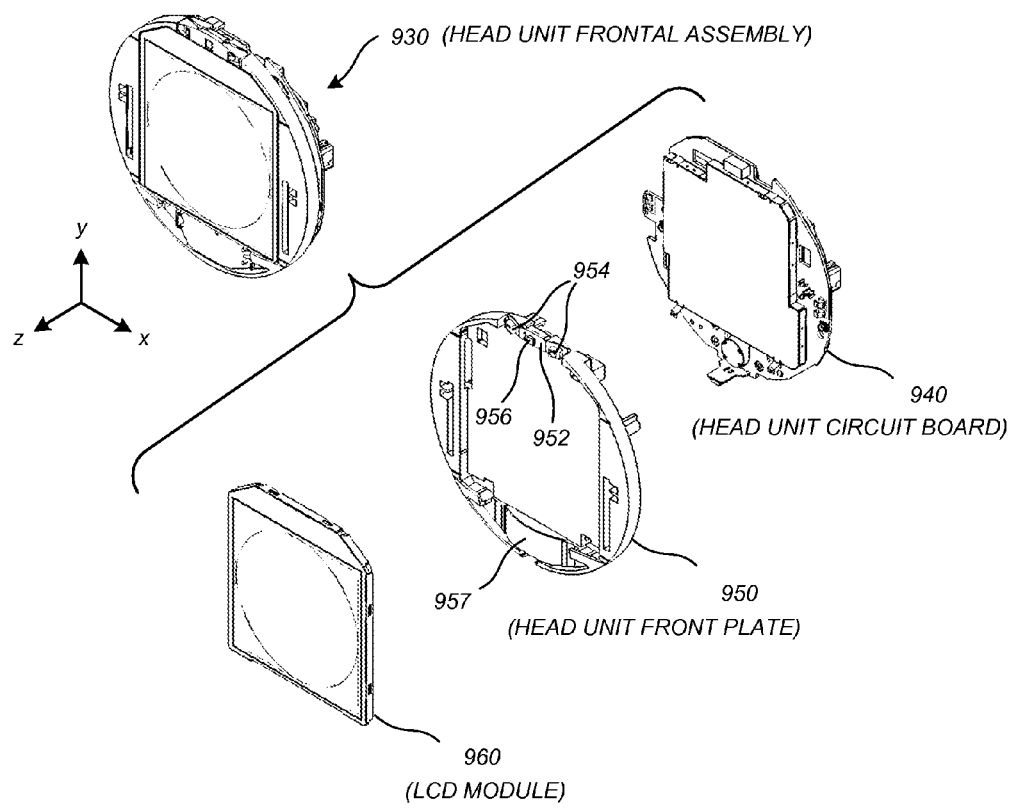
FIGS. 11A-11B illustrate exploded front and rear perspective views, respectively, of the head unit frontal assembly with respect to its primary components.
Figure 11B:
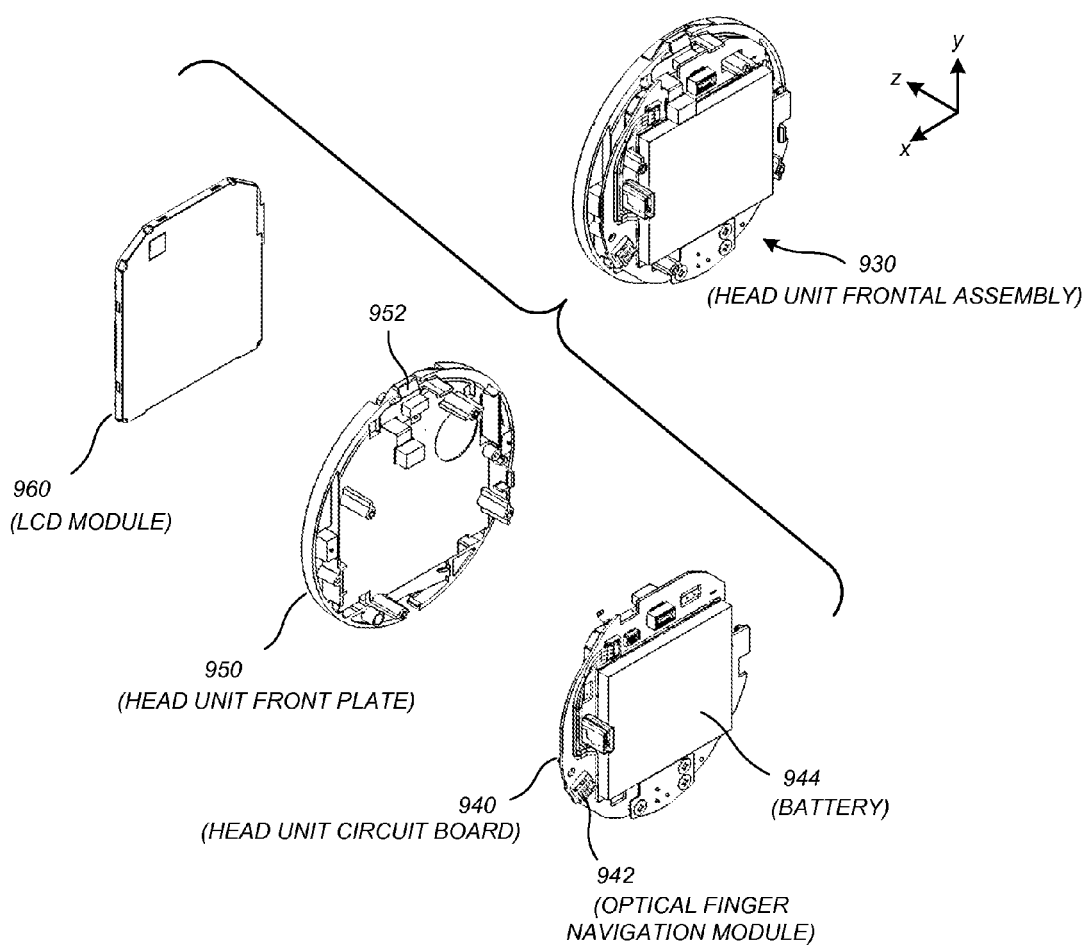

FIGS. 11A-11B illustrate exploded front and rear perspective views, respectively, of the head unit frontal assembly 930 with respect to its primary components. Head unit frontal assembly 930 comprises a head unit circuit board 940, a head unit front plate 950, and an LCD module 960. The components of the front side of head unit circuit board 940 are hidden behind an RF shield in FIG. 10A but are discussed in more detail below with respect to FIG. 13. On the back of the head unit circuit board 940 is a rechargeable Lithium-Ion battery 944, which for one preferred embodiment has a nominal voltage of 3.7 volts and a nominal capacity of 560 mAh. To extend battery life, however, the battery 944 is normally not charged beyond 450 mAh by the thermostat battery charging circuitry. Moreover, although the battery 944 is rated to be capable of being charged to 4.2 volts, the thermostat battery charging circuitry normally does not charge it beyond 3.95 volts. Also visible in FIG. 10B is an optical finger navigation module 942 that is configured and positioned to sense rotation of the outer ring 920. The module 942 uses methods analogous to the operation of optical computer mice to sense the movement of a texturable surface on a facing periphery of the outer ring 920. Notably, the module 942 is one of the very few sensors that is controlled by the relatively power-intensive head unit microprocessor rather than the relatively low-power back plate microprocessor. This is achievable without excessive power drain implications because the head unit microprocessor will invariably be awake already when the user is manually turning the dial, so there is no excessive wake-up power drain anyway. Advantageously, very fast response can also be provided by the head unit microprocessor. Also visible in FIG. 11A is a Fresnel lens 957 that operates in conjunction with a PIR motion sensor disposes thereunderneath.

Figure 12A:
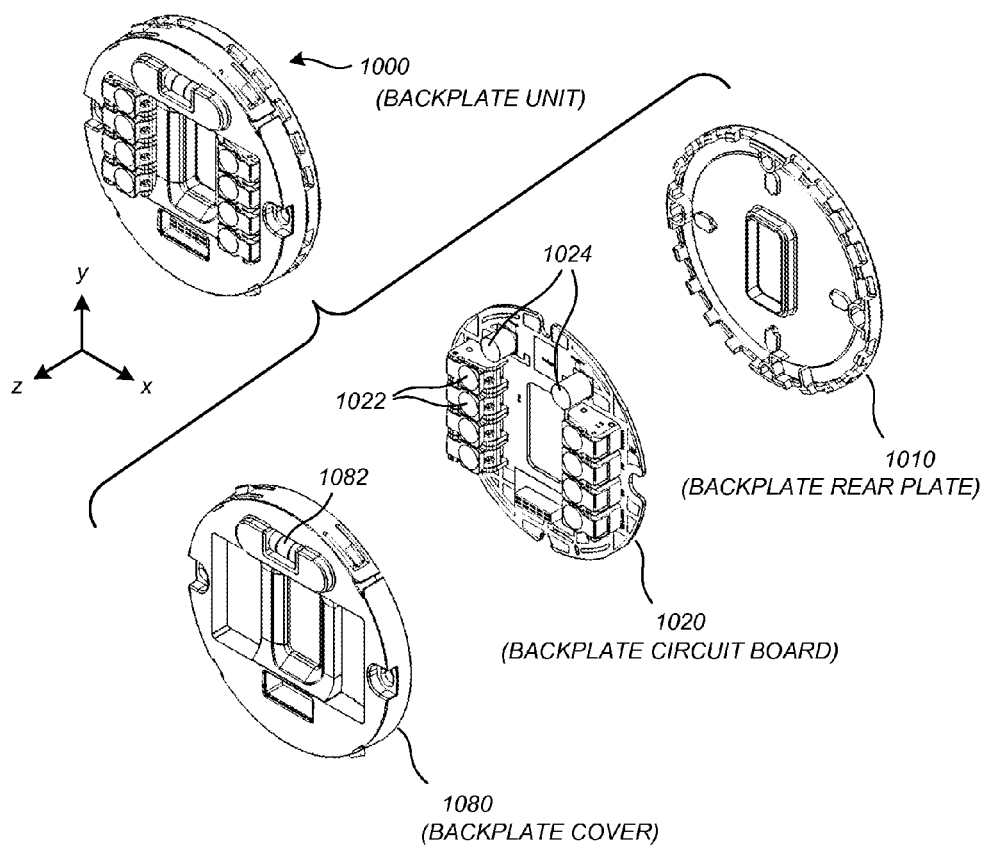
FIGS. 12A-12B illustrate exploded front and rear perspective views, respectively, of the back plate unit with respect to its primary components.
Figure 12B:
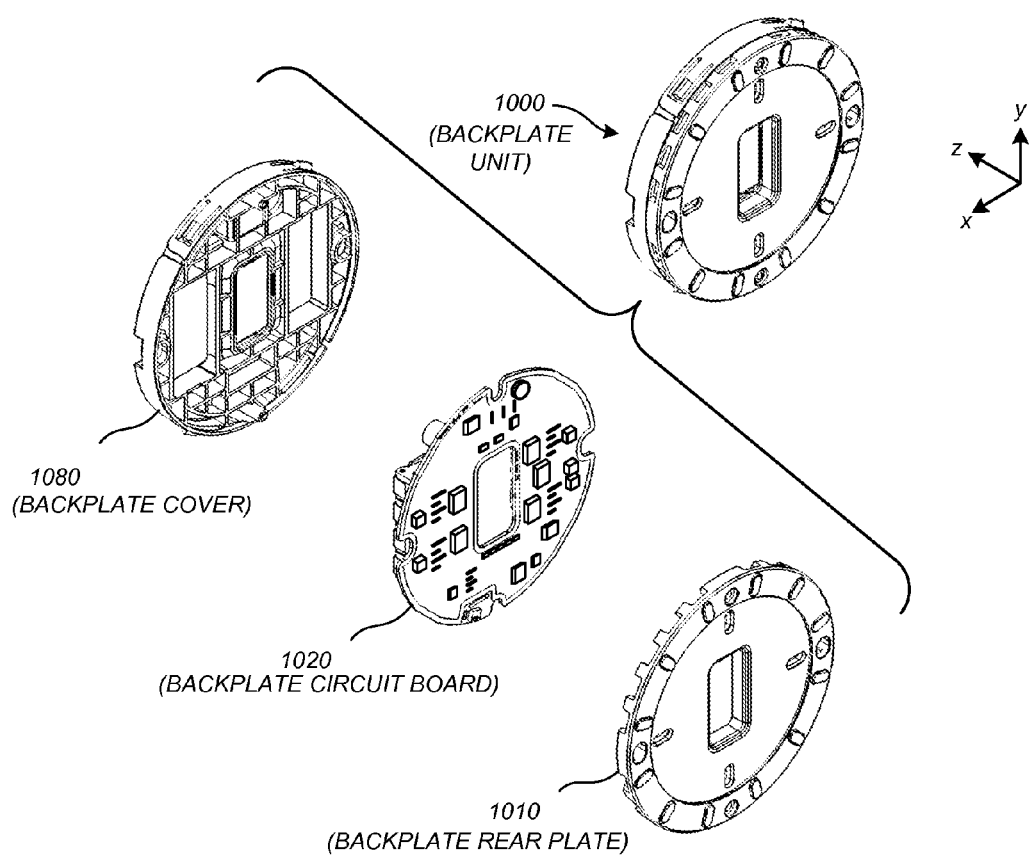

FIGS. 12A-12B illustrate exploded front and rear perspective views, respectively, of the back plate unit 1000 with respect to its primary components. Back plate unit 1000 comprises a back plate rear plate 1010, a back plate circuit board 1020, and a back plate cover 1080. Visible in FIG. 12A are the HVAC wire connectors 2122 that include integrated wire insertion sensing circuitry, and two relatively large capacitors 1024 that are used by part of the power stealing circuitry that is mounted on the back side of the back plate circuit board 1020 and discussed further below with respect to FIG. 15.

Figure 13:
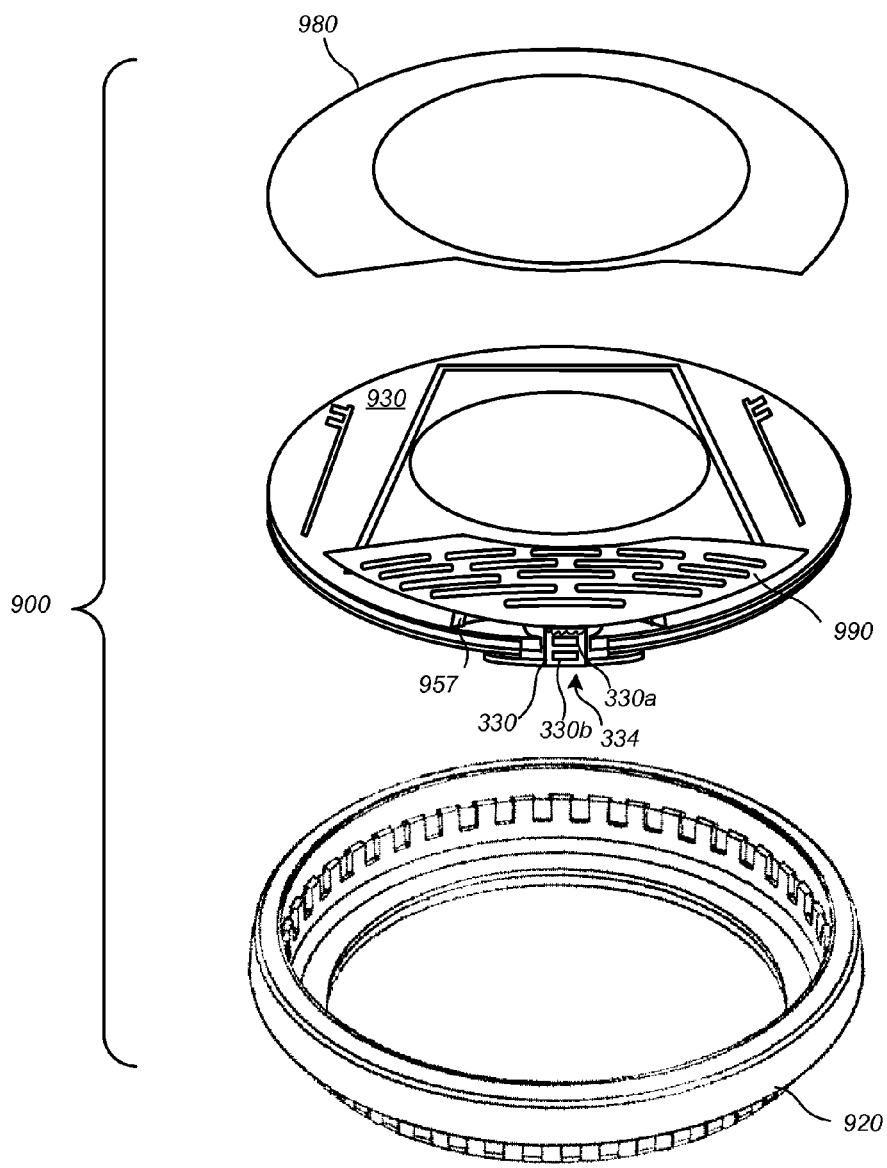
FIG. 13 illustrates a perspective view of a partially assembled head unit front, according to some embodiments.

FIG. 13 illustrates a perspective view of a partially assembled head unit front 900 showing the positioning of grille member 990 designed in accordance with aspects of the present invention with respect to several sensors used by the thermostat. In some implementations, as described further in U.S. Ser. No. 13/199,108, supra, placement of grille member 990 over the Fresnel lens 957 and an associated PIR motion sensor 334 conceals and protects these PIR sensing elements, while horizontal slots in the grille member 990 allow the PIR motion sensing hardware, despite being concealed, to detect the lateral motion of occupants in a room or area. The PIR motion sensor 334 may detect occupants moving laterally due to the shape of openings, which are slit-like and elongated along a substantially horizontal direction. In some implementations, the Fresnel lens 957 helps focus the radiation from these occupants onto the infrared sensitive sensor elements (not shown in FIG. 13) of the PIR motion sensor 334. For example, the grille member 990 has one or more openings placed over the radiation receiving elements and Fresnel lens 957 of the PIR motion sensor 334. While grille member 990 may be constructed from a variety of materials including metal, plastic, glass, carbon-composite, and metallic alloy, it is generally preferable for purposes of increased temperature sensing precision for the grille member to be made of a material with a high thermal conductivity, such as a metal or metallic alloy.

For example, where grille member 990 is made from a thermally conductive material such as a metal or metallic alloy, it operates as a "thermal antenna" and absorbs ambient temperature from a broader area than temperature sensor 330 could otherwise sample. A temperature sensor positioned substantially normal to the head unit circuit board towards grille member 990 may be close enough to receive heat absorbed by grille member 990. In some implementations, applying a thermally conductive materials, such as a paste, thermal adhesive or thermal grease between temperature sensor 330 and inward facing surface of grille member 990 improves the thermal conductivity between these two components and the accuracy of the temperature measurement. Thermally coupling grille member 990 with temperature sensor 330 assists temperature sensor 330 to measure the ambient air temperature outside rather than inside of the housing holding the thermostat.

A temperature sensor 330 uses a pair of thermal sensors to more accurately measure ambient temperature. A first or upper thermal sensor 330a associated with temperature sensor 330 tends to gather temperature data closer to the area outside or on the exterior of the thermostat while a second or lower thermal sensor 330b tends to collect temperature data more closely associated with the interior of the housing. In one implementation, each of the temperature sensors 330a and 330b comprises a Texas Instruments TMP112 digital temperature sensor chip, while the PIR motion sensor 334 comprises PerkinElmer DigiPyro PYD 1998 dual element pyrodetector.

To more accurately determine the ambient temperature, the temperature taken from the lower thermal sensor 330b is taken into consideration in view of the temperatures measured by the upper thermal sensor 330a and when determining the effective ambient temperature. This configuration can advantageously be used to compensate for the effects of internal heat produced in the thermostat by the microprocessor(s) and/or other electronic components therein, thereby obviating or minimizing temperature measurement errors that might otherwise be suffered. In some implementations, the accuracy of the ambient temperature measurement may be further enhanced by thermally coupling upper thermal sensor 330a of temperature sensor 330 to grille member 990 as the upper thermal sensor 330a better reflects the ambient temperature than lower thermal sensor 330b. Details on using a pair of thermal sensors to determine an effective ambient temperature is disclosed in U.S. Pat. No. 4,741,476, which is incorporated by reference herein.

With exemplary reference to FIG. 13, the mutual positioning and configuration of the grille member 990, Fresnel lens 957, PIR sensor 334, and temperature sensors 330a and 330b provides for an advantageous and synergistic combination of physical compactness and visual sensor concealment, along with promoting ambient temperature sensor accuracy and preserving PIR occupancy sensing functionality. In some ways this can be seen as one beneficial outcome of a "dual use" of a key volume of space lying between the Fresnel lens 957 and the surface of the PIR sensor 334, wherein the necessary spacing between the Fresnel lens 957 and the surface of the PIR sensor 334 also serves as the space across which a temperature gradient between the lower thermal sensor 330b and upper thermal sensor 330a is formed and sensed, this temperature gradient being leveraged to provide better ambient temperature sensing than would be provided by a single-point thermal sensor. In turn, the compactness promoted by the configuration of elements 957/334/330a/330b allows them to be placed behind the grille 990 without the necessity of substantially enlarging the outward protrusion of the overall housing. At the same time, for preferred implementations in which the grille member 990 is metallic and thermally coupled to the upper thermal sensor 330a, the high thermal conductivity of the grille member 990 still further enhances the accuracy of temperature measurement by acting as a "thermal antenna," which is in addition to its other functions of concealment and ambient air access.

Figure 14:
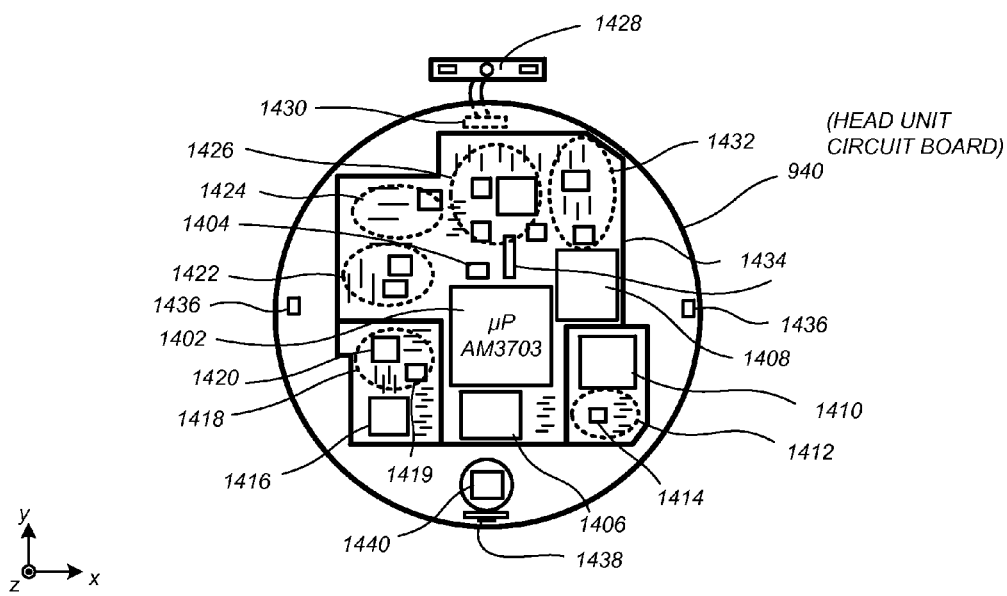
FIG. 14 illustrates a head-on view of the head unit circuit board, according to one embodiment.

FIG. 14 illustrates a head-on view of the head unit circuit board 940, which comprises a head unit microprocessor 1402 (such as a Texas Instruments AM3703 chip) and an associated oscillator 1404, along with DDR SDRAM memory 1406, and mass NAND storage 1408. For Wi-Fi capability, there is provided in a separate compartment of RF shielding 1434 a Wi-Fi module 1410, such as a Murata Wireless Solutions LBWA19XSLZ module, which is based on the Texas Instruments WL1270 chipset supporting the 802.11b/g/n WLAN standard. For the Wi-Fi module 1410 is supporting circuitry 1412 including an oscillator 1414. For ZigBee capability, there is provided also in a separately shielded RF compartment a ZigBee module 1416, which can be, for example, a C2530F256 module from Texas Instruments. For the ZigBee module 1416 there is provided supporting circuitry 1418 including an oscillator 1419 and a low-noise amplifier 1420. Also provided is display backlight voltage conversion circuitry 1422, piezoelectric driving circuitry 1424, and power management circuitry 1426 (local power rails, etc.). Provided on a flex circuit 1428 that attaches to the back of the head unit circuit board by a flex circuit connector 1430 is a proximity and ambient light sensor (PROX/ALS), more particularly a Silicon Labs SI1142 Proximity/Ambient Light Sensor with an I2C Interface. Also provided is battery charging-supervision-disconnect circuitry 1432, and spring/RF antennas 1436. Also provided is a temperature sensor 1438 (rising perpendicular to the circuit board in the +z direction containing two separate temperature sensing elements at different distances from the circuit board), and a PIR motion sensor 1440. Notably, even though the PROX/ALS and temperature sensors 1438 and PIR motion sensor 1440 are physically located on the head unit circuit board 940, all these sensors are polled and controlled by the low-power back plate microcontroller on the back plate circuit board, to which they are electrically connected.

Figure 15:
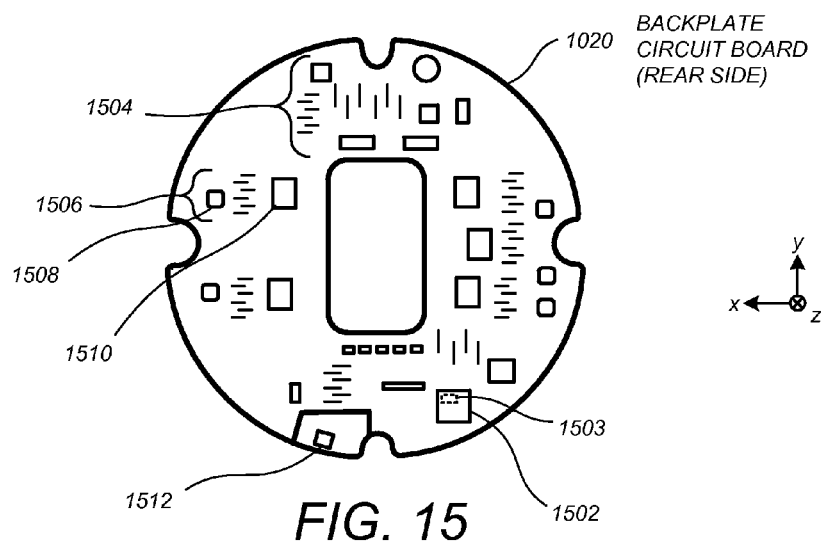
FIG. 15 illustrates a rear view of the back plate circuit board, according to one embodiment.

FIG. 15 illustrates a rear view of the back plate circuit board 1020, comprising a back plate processor/microcontroller 1502, such as a Texas InstrumentsMSP430F System-on-Chip Microcontroller that includes an on-board memory 1503. The back plate circuit board 1020 further comprises power supply circuitry 1504, which includes power-stealing circuitry, and switch circuitry 1506 for each HVAC respective HVAC function. For each such function the switch circuitry 1506 includes an isolation transformer 1508 and a back-to-back NFET package 1510. The use of FETs in the switching circuitry allows for "active power stealing", i.e., taking power during the HVAC "ON" cycle, by briefly diverting power from the HVAC relay circuit to the reservoir capacitors for a very small interval, such as 100 micro-seconds. This time is small enough not to trip the HVAC relay into the "off" state but is sufficient to charge up the reservoir capacitors. The use of FETs allows for this fast switching time (100 micro-seconds), which would be difficult to achieve using relays (which stay on for tens of milliseconds). Also, such relays would readily degrade doing this kind of fast switching, and they would also make audible noise too. In contrast, the FETS operate with essentially no audible noise. Also provided is a combined temperature/humidity sensor module 1512, such as a Sensirion SHT21 module. The back plate microcontroller 1502 performs polling of the various sensors, sensing for mechanical wire insertion at installation, alerting the head unit regarding current vs. setpoint temperature conditions and actuating the switches accordingly, and other functions such as looking for appropriate signal on the inserted wire at installation.

In accordance with the teachings of the commonly assigned U.S. Ser. No. 13/269,501, supra, the commonly assigned U.S. Ser. No. 13/275,307, supra, and others of the commonly assigned incorporated applications, the thermostat 800 represents an advanced, multi-sensing, microprocessor-controlled intelligent or "learning" thermostat that provides a rich combination of processing capabilities, intuitive and visually pleasing user interfaces, network connectivity, and energy-saving capabilities (including the presently described auto-away/auto-arrival algorithms) while at the same time not requiring a so-called "C-wire" from the HVAC system or line power from a household wall plug, even though such advanced functionalities can require a greater instantaneous power draw than a "power-stealing" option (i.e., extracting smaller amounts of electrical power from one or more HVAC call relays) can safely provide. By way of example, the head unit microprocessor 1302 can draw on the order of 250 mW when awake and processing, the LCD module 960 can draw on the order of 250 mW when active. Moreover, the Wi-Fi module 1410 can draw 250 mW when active, and needs to be active on a consistent basis such as at a consistent 2% duty cycle in common scenarios. However, in order to avoid falsely tripping the HVAC relays for a large number of commercially used HVAC systems, power-stealing circuitry is often limited to power providing capacities on the order of 100 mW-200 mW, which would not be enough to supply the needed power for many common scenarios.

The thermostat 800 resolves such issues at least by virtue of the use of the rechargeable battery (or equivalently capable onboard power storage medium) that will recharge during time intervals in which the hardware power usage is less than what power stealing can safely provide, and that will discharge to provide the needed extra electrical power during time intervals in which the hardware power usage is greater than what power stealing can safely provide. In order to operate in a battery-conscious manner that promotes reduced power usage and extended service life of the rechargeable battery, the thermostat 800 is provided with both (i) a relatively powerful and relatively power-intensive first processor (such as a Texas Instruments AM3703 microprocessor) that is capable of quickly performing more complex functions such as driving a visually pleasing user interface display and performing various mathematical learning computations, and (ii) a relatively less powerful and less power-intensive second processor (such as a Texas Instruments MSP430 microcontroller) for performing less intensive tasks, including driving and controlling the occupancy sensors. To conserve valuable power, the first processor is maintained in a "sleep" state for extended periods of time and is "woken up" only for occasions in which its capabilities are needed, whereas the second processor is kept on more or less continuously (although preferably slowing down or disabling certain internal clocks for brief periodic intervals to conserve power) to perform its relatively low-power tasks. The first and second processors are mutually configured such that the second processor can "wake" the first processor on the occurrence of certain events, which can be termed "wake-on" facilities. These wake-on facilities can be turned on and turned off as part of different functional and/or power-saving goals to be achieved. For example, a "wake-on-PROX" facility can be provided by which the second processor, when detecting a user's hand approaching the thermostat dial by virtue of an active proximity sensor (PROX, such as provided by a Silicon Labs SI1142 Proximity/Ambient Light Sensor with I2C Interface), will "wake up" the first processor so that it can provide a visual display to the approaching user and be ready to respond more rapidly when their hand touches the dial. As another example, a "wake-on-PIR" facility can be provided by which the second processor will wake up the first processor when detecting motion somewhere in the general vicinity of the thermostat by virtue of a passive infrared motion sensor (PIR, such as provided by a PerkinElmer DigiPyro PYD 1998 dual element pyrodetector). Notably, wake-on-PIR is not synonymous with auto-arrival, as there would need to be N consecutive buckets of sensed PIR activity to invoke auto-arrival, whereas only a single sufficient motion event can trigger a wake-on-PIR wake-up. Sleep-wake timing and techniques are further described in PCT/US11/61437.

Figure 16:
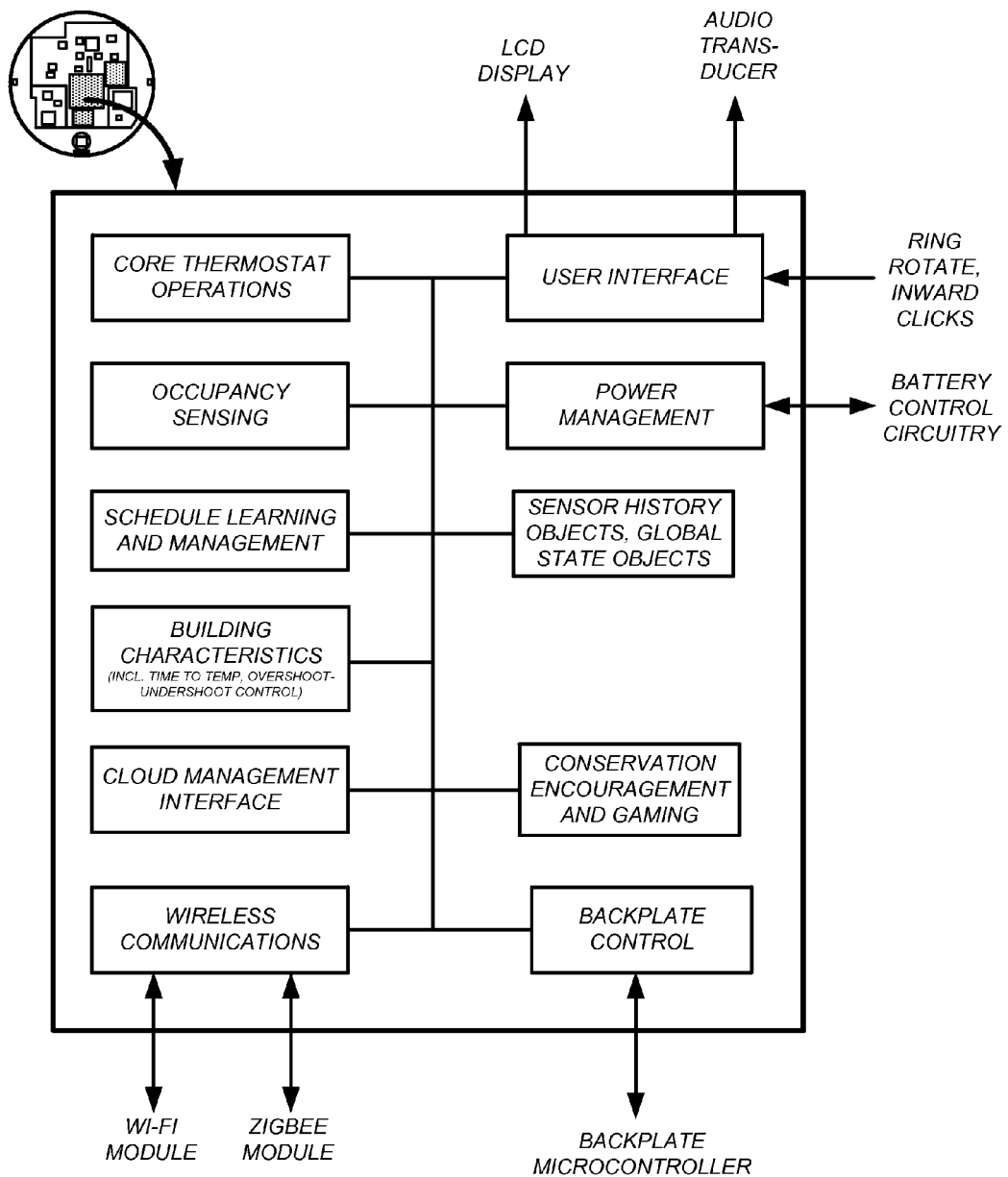
FIG. 16 illustrates a self-descriptive overview of the functional software, firmware, and/or programming architecture of the head unit microprocessor, according to one embodiment.
Figure 17:
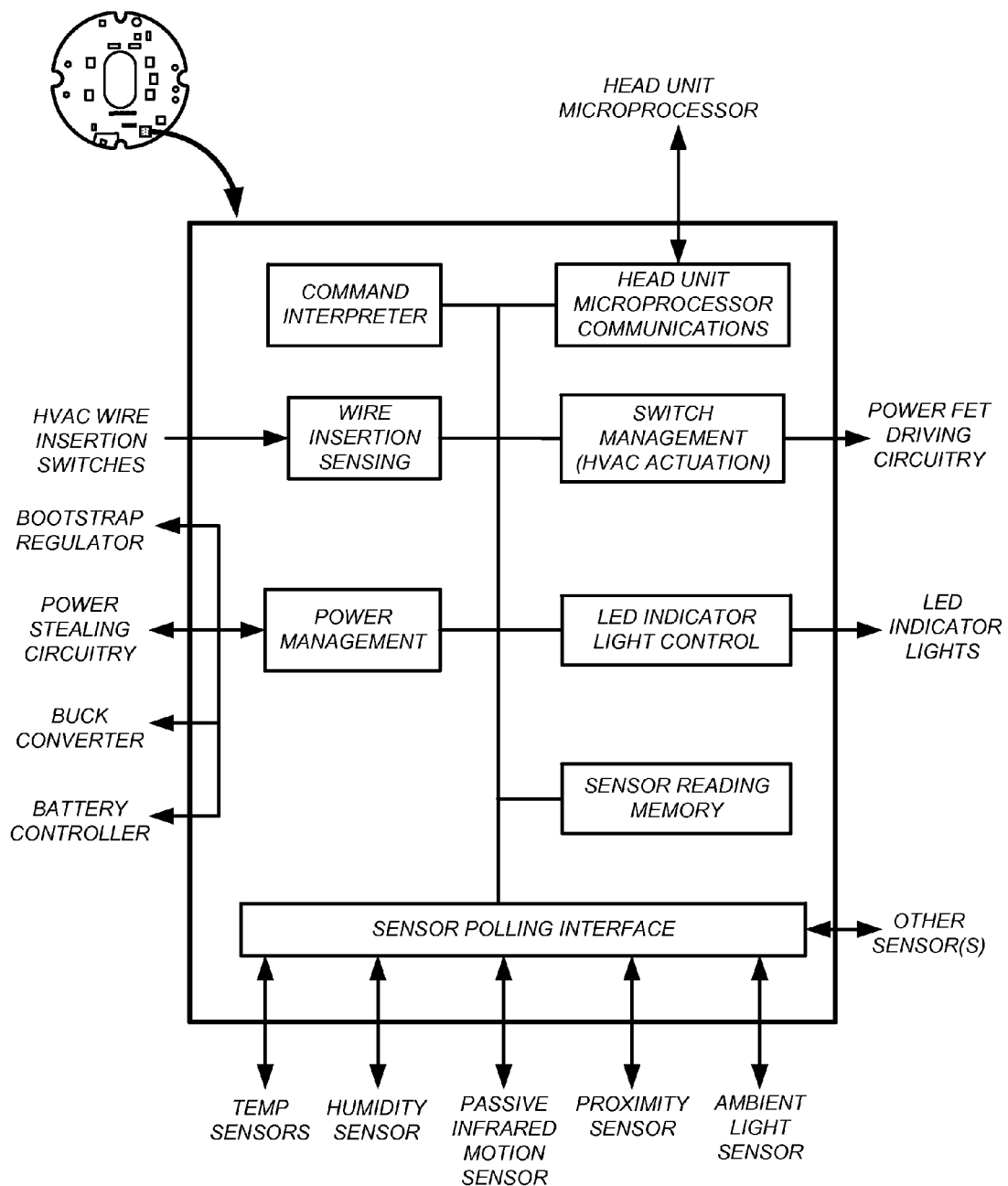
FIG. 17 illustrates a self-descriptive overview of the functional software, firmware, and/or programming architecture of the back plate microcontroller, according to one embodiment.

FIG. 16 illustrates a self-descriptive overview of the functional software, firmware, and/or programming architecture of the head unit microprocessor 1402 for achieving its described functionalities. FIG. 17 illustrates a self-descriptive overview of the functional software, firmware, and/or programming architecture of the back plate microcontroller 1502 for achieving its described functionalities.

FIGS. 18A-18B illustrates in detail how infrared sources interact with slit-like openings in a grille member designed in accordance with embodiments of the present invention. To highlight the interactions, FIG. 18A illustrates grille member 990 with openings 995 and PIR motion sensor 334 positioned behind grille member 990 as it would be in a thermostat designed in accordance with embodiments of the present invention. In accordance with some implementations, openings 995 are slit-like along a substantially horizontal direction as illustrated. Infrared sources may sweep across a continuous wide range of angles such as by the lateral movement an occupant walking across a room or other area. To represent this range, FIG. 18A has arrows representing a left infrared source 1802, a center infrared source 1806 and a right infrared source 1804. For example, an occupant walking across a room in front of a thermostat with grille member 990 may first emit radiation appearing as a left infrared source 1802 then gradually a center infrared source 1806 and then gradually a right infrared source 1804.

As FIG. 18A shows schematically, the slit-like openings 995 of grille member 990 allow a wide range of infrared sources to pass through towards PIR motion sensor 334. Both left infrared source 1802 and right infrared source 1804 may pass along the elongated horizontal openings 995 as indicated by the arrows of these sources. Center infrared source 1806 also passes through openings 995 in grille member 990 as allowed by the vertical height of one or more of the elongated slits. It therefore can also be appreciated that the openings 995 from grille member 990 having a slit-like shape to allow the PIR motion sensor 334 to detect the radiation emitted by an occupant moving laterally across a wide-range of angles near the thermostat. For example, grille member 990 can detect an occupant moving on the left side of grille member 990 as a left infrared source 1802 or on the right side of grille member 990 as a right infrared source 1804. A person moving approximately in the center of grille member 990 would appear as a center infrared source 1806 and also pass through openings 995 towards PIR motion sensor 334. Indeed, grille member 990 would also pass many other infrared sources at angles between left infrared source 1802, center infrared source 1806 and right infrared source 1804 through openings 995 towards PIR motion sensor 334.

FIG. 18B illustrates the effect of an occupant moving past a PIR motion sensor in a thermostat covered by a grille member of the present invention. The PIR motion sensor (not shown in FIG. 18B) sits behind grille member 990 much like PIR motion sensor 334 in FIG. 18A. The PIR motion sensor is capable of detecting a lateral change of radiation 1810 caused by a laterally moving source of infrared radiation such as a person walking in a room. To make the occupancy detector work properly, these lateral changes in radiation 1810 caused by the occupant must be distinguished from overall changes in the infrared radiation caused by sunlight and ambient heat sometimes referred to as the common-mode signal.

In some implementations, the PIR motion sensor has a pair of differential sensing elements setup with opposing polarity to reject the common-mode signal produced by radiation 1810. When occupant 1808 is not present or not moving, sudden overall changes in radiation 1810 caused by sunlight, heat or vibration produce complimentary signals from the pair of differential sensing elements simultaneously. The complimentary signals from the pair of differential sensing elements immediately cancel out these false-positive or common-mode signals.

In comparison, an occupant 1808 moving laterally in the direction of the arrows in FIG. 18B across a room or other space near thermostat 800 creates a local change in radiation 1810. The local change in radiation 1810 is detected and not canceled out with the common-mode signal portion of radiation 1810 as the sensing elements are arranged along a horizontal axis and triggered sequentially, not simultaneously, by the lateral movement. Because openings 995 in grille member 990 are slit-like, radiation 1810 enters thermostat 800 and is detected by PIR motion sensor whether the occupant 1808 is moving laterally from the far right, far left or laterally near the center area near the thermostat.

FIGS. 19A-19D illustrate altering the openings of a grille member along a vertical distance to change the sensitivity of a PIR motion sensor in accordance with aspects of the present invention. Generally, the PIR motion sensor's sensitivity to the height of occupants can be changed by varying the vertical span of the openings in a grille member. In accordance with some implementations, a grille member 1902 illustrated in FIG. 19A is located on a forward-facing surface of the thermostat 1910 mounted on a wall. Thermostat 1910 is partially shown in FIG. 19B for convenience yet is similar to thermostat 800 described and illustrated above. Grille member 1902 in FIG. 19A has several rows of openings 1906, each having a slit-like shape and organized along a vertical span 1904. Accordingly, a PIR motion sensor (not shown in FIGS. 19A-19D) behind grille member 1902 used with thermostat 1910 in FIG. 19B and has an angle of sensitivity 808 or $\theta_1$. If an occupant's height is within the angle of sensitivity 1908 then the PIR motion sensor in thermostat 1910 in FIG. 19B should be able to detect the radiation emitted from the occupant's lateral movement. Conversely, an occupant whose height falls below the angle of sensitivity 1908, is not likely to be detected by the PIR motion sensor in thermostat 1910 in FIG. 19B.

In accordance with an alternate implementation, sensitivity to height may be decreased as illustrated in FIG. 19C by reducing the number of rows or openings across the vertical span. Compared with grille member 1902, the number of rows of openings 1916 in grille member 1912 illustrated in FIG. 19C are fewer in number than the rows of openings 1906. Moreover, openings 1916 in grille member 1912 are spread over a vertical span 1914 that is both narrower and positioned higher than the vertical span 1904 in the grille member 1902. Consequently, using the grille member 1912 in the thermostat 1910 in FIG. 19D results in a narrower angle of sensitivity 1918 or $\theta_2$ compared with the angle of sensitivity 1908 or $\theta_1$ previously described. For example, a PIR motion sensor behind the grille member 1912 on the thermostat 1910 in FIG. 19D will not detect occupants whose height is outside the angle of sensitivity 1918 or $\theta_2$. As a result, the same occupants detected by thermostat 1910 with the grille member 1902 might not be tall enough to be detected by the thermostat 1910 using the grille member 1912. Depending on the installation, it may be more desirable to use a grille member more like grille member 1912 in order to limit detection of occupants that are taller in height. To detect occupants that may be shorter in height, use of grille member 1902 in thermostat 1910 may be more desirable.

Since FIGS. 19A-19D are meant to be illustrative, the shape, number, size, organization and location of openings in grille member 1902 and 1912 are but exemplary and used for comparison purposes. Indeed, the designs of grille members of the present invention should not be limited by specific sizes, number of openings, specific shapes or the absolute or relative positions of these or other features.

In some implementations, different grille members may be manufactured with a different number of openings having slit-like dimensions arranged in one or more rows. For example, a person installing thermostat 1910 may select and install different grille members depending on the desired sensitivity to the heights of the occupants and the location of the thermostat 1910 on a wall or other location. In other implementations, the installer may use a mask member attached to the back openings in the grille member to modify the openings and adjust the sensitivity to height. Instead of manufacturing different grille members, one grille member can be altered using the mask member to cover or uncover the desired number of openings in the grille member. For example, the mask member may be plastic or metal fittings with slit-like dimensions applied to the backside of grille member 1902 that fill one or more of openings 1906. These fittings of the mask member may be finished in the same tone or color as the surface of grille member 1902 in order to blend into the overall appearance of the grille member 1902. Accordingly, the sensitivity to the height of occupants may be varied depending on the coverage by the mask member of the substantially horizontal slit-like openings used to pass the emitted radiation to the receiving surface of the PIR motion sensor.

Figure 20:
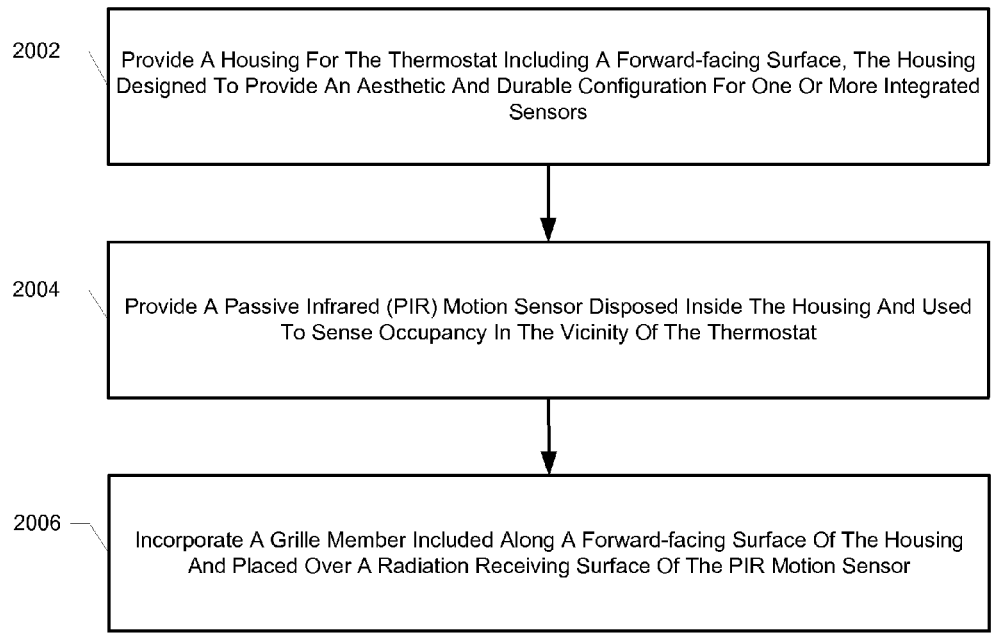
FIG. 20 is flow chart diagram that outlines the operations associated with integrating sensor capabilities with a thermostat and grille member in accordance with aspects of the present invention.

Referring to FIG. 20, a flow chart diagram outlines the operations associated with integrating sensor capabilities with a thermostat and grille member in accordance with aspects of the present invention. In some implementations, the integration operations include providing a housing for the thermostat designed to provide an attractive and durable configuration for one or more integrated sensors (2002). The thermostat is enclosed by a housing with a forward-facing surface for a cover and grille member in accordance with aspects of the present invention. The one or more integrated sensors protected by the housing may include an occupancy sensor such as a PIR motion detector, a temperature sensor, a humidity sensor, a proximity sensor or other sensors that might be useful in operating a thermostat. Placing these and other sensors inside the housing protects them from being accidentally jarred or broken during manufacture, shipping, installation or use. Because sensors are protected inside the housing, they are more likely to retain their calibration and provide accurate measurement results for the thermostat.

Additionally, the integration operations may also provide a passive infrared (PIR) motion sensor disposed inside the housing and used to sense occupancy in the vicinity of the thermostat (2004). In some implementations, the PIR motion sensor has a radiation receiving surface able to detect the radiation emitted towards the forward-facing surface of the housing by the lateral movement of a nearby occupant. Occupancy information detected by the PIR motion sensor may be used by the thermostat to better adjust heating or cooling operations of an HVAC in an enclosure such as a residential house. In some implementations, a thermostat may use the occupancy information to turn the HVAC on when occupancy is detected and off when no occupancy is detected by the PIR motion sensor. In alternate implementations, the thermostat may use the occupancy information generated by the PIR motion sensor as part of a heuristic that learns when an enclosure is likely to be occupied or unoccupied and anticipates the heating or cooling requirements. This heuristic may use real-time and historic geographic weather trends and other factors combined with learned occupancy patterns to determine when the enclosure needs cooling or heating. A temperature sensor disposed inside the housing may also be provided to detect the ambient temperature in the vicinity of the thermostat. The PIR motion sensor and temperature sensor may be similar to PIR motion sensor 334 and temperature sensor 330 respectively as previously described.

Integration operations in accordance with the present invention may further attach a grille member along a forward-facing surface of the housing and placed over the radiation receiving surface of the PIR motion sensor (2006). As previously described, the grille member may substantially conceal and protects the PIR motion sensor disposed inside the housing. Concealing the PIR motion sensor promotes a visually pleasing quality of the thermostat as well as protects the PIR motion sensor during manufacture, shipment, installation and use. In some implementations, the grille member may be similar to grille member 990. Accordingly, the grille member may be manufactured from one or more materials selected from a set of materials including: metal, plastic, glass, carbon-composite, metallic-carbon composite and metallic alloy. The grille member may be a thermally conductive material such as a metal or metal alloy and may be thermally coupled to the temperature sensor also disposed inside the housing of the thermostat. In some implementations, thermally coupling the temperature sensor to the grille member assists with the temperature sensors ability to measure an ambient temperature of air measured outside of the housing rather than inside of the housing.

Provided according to one preferred embodiment is a self-qualification algorithm by which a thermostat determines whether it can, or cannot, reliably go into an auto-away state to save energy, i.e., whether it has "sensor confidence" for its PIR activity. For one preferred embodiment, the auto-away facility is disabled for a predetermined period such as 7 days after device startup (i.e., initial installation or factory reset). On days 5, 6, and 7 from startup (or other empirically predetermined suitable sample time period), the PIR activity is tracked by discrete sequential "time buckets" of activity, such as 5-minute buckets, where a bucket is either empty (if no occupancy event is sensed in that interval) or full (if one or more occupancy events is sensed in that interval). Out of the total number of buckets for that time period (24×12×3=864 for 5-minute buckets), if there is greater than a predetermined threshold percentage of buckets that are full, then "sensor confidence" is established, and if there is less than that percentage of full buckets, then there is no sensor confidence established. The predetermined threshold can be empirically determined for a particular model, version, or setting of the thermostat. In one example, it has been found that 3.5% is a suitable threshold, i.e., if there are 30 or more full buckets for the three-day sample, then "sensor confidence" is established, although this will vary for different devices models and settings.

Provided according to another preferred embodiment is a method for the automated computation of an optimal threshold value for the active proximity detector (PROX) of the thermostat 1800, by virtue of additional occupancy information provided by its PIR sensor. In order to conserve power and extend the lifetime of the LCD display and the rechargeable battery, as well as for aesthetic advantages in preventing the thermostat from acting as an unwanted nightlight, the PROX detector is integrated into the thermostat 1800 and polled and controlled by the back plate microcontroller (hereinafter "BPµC") on a consistent basis to detect the close proximity of a user, the LCD display being activated only if there is a walk-up user detected and remaining dark otherwise. Operationally, the PROX is polled by the BPμC at regular intervals, such as every 1/60th of a second, and a PROX signal comprising a DC-removed version of the PROX readings (to obviate the effects of changes in ambient lighting) is generated by the BPμC and compared to a threshold value, termed herein a "PROX threshold". If the PROX signal is greater than the PROX threshold, the BPμC wakes up the head unit microprocessor ("hereinafter "HUμP"), which then activates the LCD display. It is desirable for the PROX threshold to be judiciously chosen such that (i) the PROX facility is not overly sensitive to noise and background activity, which would lead to over-triggering of the PROX and unnecessary waking of the power-intensive HUμP and LCD display, but that (ii) the PROX is not overly insensitive such that the quality of the user experience in walk-up thermostat use will suffer (because the user needs to make unnatural motion, for example, such as waving their hand, to wake up the unit).

According to one preferred embodiment, the PROX threshold is recomputed at regular intervals (or alternatively at irregular intervals coincident with other HUμP activity) by the HUμP based on a recent history of PROX signal readings, wherein PIR data is included as a basis for selecting the historical time intervals over which the PROX signal history is processed. It has been found that the best PROX thresholds are calculated for sample periods in which the noise in the PROX signal is due to "natural" background noise in the room (such as household lamps), rather than when the PROX signal is cluttered with occupant activity that is occurring in the room which, generally speaking, can cause the determined PROX threshold to be higher than optimal, or otherwise suboptimal. Thus, according to a preferred embodiment, the HUμP keeps a recent historical record of both PIR activity (which it is collecting anyway for the auto-away facility) as well as PROX signal readings, and then periodically computes a PROX threshold from the recent historical PROX data, wherein any periods of PIR-sensed occupant activity are eliminated from the PROX data sample prior to computation of the PROX threshold. In this way, a more reliable and suitably sensitive, but not overly sensitive, PROX threshold is determined. For one embodiment, the BPμC keeps one sample of the PROX signal data for every 5 minutes, and transfers that data to the HUμP each time the HUμP is woken up. For one embodiment, the HUμP keeps at least 24 hours of the PROX signal data that is received from the BPμC, and recomputes the PROX threshold at regular 24 hour intervals based on the most recent 24 hours of PROX data (together with a corresponding 24 hours of PIR-sensed occupancy data, such as the above-described auto-away "buckets" of activity). For another embodiment, the PROX threshold is recomputed by the HUμP every time it is about to enter into a sleep state. The recomputed PROX threshold is transferred to the BPμC, which then uses that new PROX threshold in determining whether a PROX event has occurred. In other preferred embodiments, the thermostat is further configured to harness the available ALS (ambient light sensor) data to generate an event better PROX threshold, since it is known that ambient light can add to the background PROX signal noise as well as to the DC value of the PROX readings.

While examples and implementations have been described, they should not serve to limit any aspect of the present invention. Accordingly, various modifications may be made without departing from the spirit and scope of the invention. Indeed, while the occupancy sensor positioned behind the grille member is characterized in one or more embodiments supra as being a PIR sensor, for which the above-described configurations are particularly advantageous, the scope of the present teachings is not so limited. Moreover, it is to be appreciated that while the grille member is characterized in one or more embodiments supra as being generally forward-facing, which is useful for more common scenarios in which the thermostat is mounted on a wall at a moderate height above the floor that makes it easy to reach, the scope of the present teachings is not so limited. By way of example, there is provided in some further embodiments a thermostat, comprising a housing including a region of interest-facing surface (ROI-facing surface), where the ROI corresponds to the relevant area or volume of the house (or other enclosure) for which occupancy or occupancy-related events are to be sensed. The thermostat further includes an occupancy sensor disposed inside the housing and used to sense occupancy in the ROI, the occupancy sensor having at least one receiving surface and being able to detect the presence and/or movement of the occupant in the ROI. The thermostat further includes a grille member having one or more openings and included along the ROI-facing surface of the housing and placed over the one or more receiving surfaces of the occupancy sensor that substantially conceals and protects the occupancy sensor disposed inside the housing, whereby the concealment of the occupancy sensor by the grille member promotes a visually pleasing quality of the thermostat yet permits the occupancy sensor to effectively detect the presence and/or movement of the occupant in the ROI. The ROI-facing surface can be a forward-facing surface for a conventional wall-mounted location, or can be a downward-facing surface (including a diagonally-outward downward angle) for a mounting location that is above a doorway, for example, such that persons going in and out of the room are sensed. The occupancy sensor can include, for example, one or more of a PIR sensor, an actively transmitting proximity sensor, an ambient light sensor, and an ultrasound sensor. In the case of a PIR sensor and a mounting location over the doorway, the slotted openings in the grille member can be oriented in a direction normal to the door opening, such that movement toward and away from the door is more optimally sensed. It is to be further appreciated that the term thermostat, as used hereinabove and hereinbelow, can include thermostats having direct control wires to an HVAC system, and can further include thermostats that do not connect directly with the HVAC system, but that sense an ambient temperature at one location in an enclosure and cooperatively communicate by wired or wireless data connections with a separate thermostat unit located elsewhere in the enclosure, wherein the separate thermostat unit does have direct control wires to the HVAC system. By way of further example, the front face of the thermostat 100/800 is set forth in one or more embodiments supra as being a solid lens that tends to magnify the information being displayed in the underlying electronic display. The solid lens element furthermore provides a hard, solid surface that allows the user to treat the overall cap-like structure as a single, unitary input button for providing the inward click in many embodiments, such that the user does not need to press only on the outer ring but can also press anywhere on the interior as well to achieve an inward click input. Notably, however, the scope of the present teachings is not so limited. In alternative embodiments, this thicker lens to be omitted in favor of a thinner covering and the underlying electronic display can comprise a touch screen display. to allow a user to directly interact with the monitor. In other alternative embodiments, the outer ring is itself a touch screen or touch-sensitive surface, such that it may be virtually rotated by a user's finger movement. The display within the ring can include or omit touch-detection capabilities without departing from the scope of the present teachings. In one instance, an outer ring may be a physically rotatable ring, and a display presented in a middle aperture inside the ring may be a touch screen such that, for example, the user may select a type of variable to be set using the touch-screen display and then select a particular value for the variable using the outer ring. By way of further example, while rotation of the outer ring of the thermostat 100/800 is set forth in one or more embodiments supra as being detected optically based on a textured inner surface of the ring (using technology similar to that using in optical mice), the scope of the present teachings is not so limited. For example, the outer ring may be coupled to a disk, the disk having a plurality of holes, whose movement can be detected optically by optical sources and detectors placed on opposite sides. As another example, the outer ring may include a magnet at a fixed location. By detecting the angular location of the magnet over time (e.g., using fixed sensors), a mechanical rotation of the ring may be determined. As another example, the outer ring may include a plurality of mechanical catches, and a fixed switch or other mechanical sensor may count a number of contacts with the mechanical catches and estimate the mechanical rotation of the ring. By way of further example, while there are indeed many advantages of using an outer ring that is a continuous without fiducial markers, it is not necessarily outside the scope of the present teachings for the outer ring to be provided with some fiducial markers, or for the outer ring to be replaced by some other arc-shaped or linear component having equivalent functionality and advantages. Accordingly, the invention is not limited to the above-described implementations, but instead is defined by the appended claims in light of their full scope of equivalents.

Numerous specific details are included herein to provide a thorough understanding of the various implementations of the present invention. Those of ordinary skill in the art will realize that these various implementations of the present invention are illustrative only and are not intended to be limiting in any way. Other implementations of the present invention will readily suggest themselves to such skilled persons having the benefit of this disclosure.

In addition, for clarity purposes, not all of the routine features of the implementations described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure.

What is claimed is:

1. A thermostat comprising:
   a housing;
   a rotatable user-interface component configured to track a rotational input motion of a user;
   an electronic display disposed on a front face of the housing; and
   a processing system disposed within the housing and coupled to the rotatable user interface component and to the electronic display, the processing system being configured to dynamically identify a setpoint temperature value based on the tracked rotational input motion, the processing system being further configured to be in operative communication with one or more temperature sensors for receiving an ambient air temperature, the processing system being still further configured to be in operative communication with a heating, ventilation, and air conditioning (HVAC) system to control the HVAC system based at least in part on a comparison of the measured ambient temperature and the setpoint temperature value,
   wherein said processing system, said electronic display, and said rotatable user interface component are collectively configured such that each of a first mode of operation and a second mode of operation is provided, said first and second modes of operation being in effect at different times,
   wherein, during said first mode of operation, a graphical setpoint icon is displayed along a periphery of the electronic display at a first location that is spatially representative of said setpoint temperature value as identified by said processing system according to said tracked rotational input motion of the user,
   wherein, during said second mode of operation, a rotatable arrangement of selectable menu items is displayed along said periphery of the electronic display, said rotatable arrangement being caused to rotate around said periphery responsive to tracked user rotation of the rotatable user interface component, said user rotation further causing different respective ones of the selectable menu items to become visually highlighted as said rotatable user interface component is rotated, and
   wherein a user selection of one of said selectable menu items is established by a user confirmation input provided by the user while that selectable menu item is visually highlighted.

2. The thermostat of claim 1, wherein said rotatable user-interface component is further configured to be inwardly pressable in a manner that is detectable by the processor, and wherein said user confirmation input provided during said second mode of operation comprises an inward pressing of said rotatable user-interface component.

3. The thermostat of claim 1, wherein said rotatable user-interface component is further configured to be inwardly pressable in a manner that is detectable by the processor, and wherein the thermostat is configured to switch from said first mode of operation to said second mode of operation in response to an inward pressing of said rotatable user-interface component applied during said first mode of operation.

4. The thermostat of claim 1, wherein said electronic display is substantially circular in shape, and wherein said rotatable user-interface component comprises a mechanically rotatable ring that substantially surrounds said electronic display.

5. The thermostat of claim 4, wherein one or more of said selectable menu items comprises an alphanumeric representation, and wherein said visual highlighting is applied only to the selectable menu item currently appearing at a twelve o'clock position around said periphery such that the currently highlighted menu item appears in an upright orientation.

6. The thermostat of claim 1, wherein, during said first mode of operation, the electronic display displays a trailing icon extending along said periphery between (i) said setpoint icon at said first location, and (ii) a second location along said periphery that is spatially representative of said measured ambient temperature, whereby an amount of temperature rise or temperature drop required for the measured ambient temperature to become equal to the setpoint temperature is readily apparent to the user during said first mode of operation by virtue of a length of said trailing icon along said periphery.

7. The thermostat of claim 6, wherein said setpoint icon comprises a prominently visible tick mark, and wherein said trailing icon comprises a plurality of less prominently visible tick marks arranged along said periphery between said first and second locations.

8. A method for control of an HVAC system by a thermostat, the thermostat comprising a housing, a rotatable user-interface component, a processing system, and an electronic display, the method comprising:
  detecting and tracking rotational movements of the rotatable user-interface component to track at least one rotational input motion of a user;
  when the thermostat is operating in a first mode of operation:
    dynamically identifying a setpoint temperature value based on the tracked rotational input motion;
    receiving, from one or more temperature sensors, an ambient air temperature;
    controlling the HVAC system based at least in part on a comparison between the ambient air temperature and the setpoint temperature value; and
    displaying, on the electronic display, a graphical setpoint icon along a periphery of the electronic display that is spatially representative of said setpoint temperature value as identified according to said tracked rotational input motion of the user; and
  when the thermostat is operating in a second mode of operation:
    displaying a rotatable arrangement of selectable menu items along said periphery of the electronic display;
    rotating said rotatable arrangement around said periphery responsive to the tracked user rotation of the rotatable user interface component, wherein different respective ones of the selectable menu items become visually highlighted as said rotatable user interface component is rotated;
    detecting a user confirmation input; and
    identifying a selected menu item as a menu item visually highlighted when the user confirmation input was detected,
  wherein said first and second modes of operation are in effect at different times.

9. The method of claim 8, wherein detecting the user confirmation input comprises detecting an inward pressing of said rotatable user-interface component.

10. The method of claim 8, further comprising, further comprising:
  when the thermostat is operating in a first mode of operation:
  detecting an inward pressing of said rotatable user-interface component; and
  subsequent to the detection of the inward pressing, switching from the first mode of operation to the second mode of operation.

11. The method of claim 8, wherein said electronic display is substantially circular in shape, and wherein said rotatable user-interface component comprises a mechanically rotatable ring that substantially surrounds said electronic display.

12. The method of claim 11, wherein one or more of said selectable menu items comprises an alphanumeric representation, and wherein said visual highlighting is applied only to the selectable menu item currently appearing at a twelve o'clock position around said periphery such that the currently highlighted menu item appears in an upright orientation.

13. The method of claim 8, further comprising, when the thermostat is operating in said first mode of operation:
  displaying, on the electronic display, a trailing icon extending along said periphery between (i) said setpoint icon at said first location, and (ii) a second location along said periphery that is spatially representative of said ambient temperature, whereby an amount of temperature rise or temperature drop required for the ambient temperature to become equal to the setpoint temperature is readily apparent to the user during said first mode of operation by virtue of a length of said trailing icon along said periphery.

14. The method of claim 13, wherein said setpoint icon comprises a prominently visible tick mark, and wherein said trailing icon comprises a plurality of less prominently visible tick marks arranged along said periphery between said first and second location.

15. A method for control of an HVAC system by a thermostat, the thermostat comprising a housing, a rotatable user-interface component, a processing system, and an electronic display, the method comprising:
  detecting and tracking rotational movements of the rotatable user-interface component to track at least one rotational input motion of a user;
  when the thermostat is operating in a first mode of operation:
    dynamically identifying a setpoint temperature value based on the tracked rotational input motion;
    receiving, from one or more temperature sensors, an ambient air temperature;
    controlling the HVAC system based at least in part on a comparison between the ambient air temperature and the setpoint temperature value;
    displaying, on the electronic display, an indication of said setpoint temperature value as identified according to said tracked rotational input motion of the user;
    detecting a mode-changing input; and
    subsequent to the detection of the mode-changing input, switching from the first mode of operation to the second mode of operation; and
  when the thermostat is operating in a second mode of operation:
    displaying a rotatable arrangement of selectable menu items along said periphery of the electronic display;
    rotating said rotatable arrangement around said periphery responsive to the tracked user rotation of the rotatable user interface component, wherein different respective ones of the selectable menu items become visually highlighted as said rotatable user interface component is rotated;
    detecting a user confirmation input; and
    identifying a selected menu item as a menu item visually highlighted when the user confirmation input was detected,
  wherein said first and second modes of operation are in effect at different times.

16. The method of claim 15, wherein detecting the mode-changing input comprises detecting an inward pressing of said rotatable user-interface component.

17. The method of claim 15, wherein said indication of said setpoint temperature value is indicative of the setpoint temperature value by virtue of its spatial location on the display.

18. The method of claim 15, wherein said indication of said setpoint temperature value comprises a graphical icon.

19. The method of claim 15, wherein said electronic display is substantially circular in shape, and wherein said rotatable user-interface component comprises a mechanically rotatable ring that substantially surrounds said electronic display.

20. The method of claim 15, further comprising, when the thermostat is operating in said first mode of operation:
    displaying, on the electronic display, a trailing icon, whereby an amount of temperature rise or temperature drop required for the ambient temperature to become equal to the setpoint temperature is readily apparent to the user during said first mode of operation by virtue of a length of said trailing icon.

* * * * *